(12) United States Patent
Tomlin

(10) Patent No.: US 11,132,359 B2
(45) Date of Patent: *Sep. 28, 2021

(54) SYSTEMS AND METHODS FOR GROUPING AND ENRICHING DATA ITEMS ACCESSED FROM ONE OR MORE DATABASES FOR PRESENTATION IN A USER INTERFACE

(71) Applicant: Palantir Technologies Inc., Palo Alto, CA (US)

(72) Inventor: Luke Tomlin, London (GB)

(73) Assignee: Palantir Technologies Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/597,738

(22) Filed: Oct. 9, 2019

(65) Prior Publication Data
US 2020/0042519 A1 Feb. 6, 2020

Related U.S. Application Data

(63) Continuation of application No. 14/948,936, filed on Nov. 23, 2015, now Pat. No. 10,489,391.
(Continued)

(51) Int. Cl.
*G06F 16/242* (2019.01)
*G06F 3/0484* (2013.01)
*G06F 16/2457* (2019.01)

(52) U.S. Cl.
CPC ........ *G06F 16/2423* (2019.01); *G06F 3/0484* (2013.01); *G06F 16/24578* (2019.01)

(58) Field of Classification Search
CPC .......... G06F 16/2423; G06F 16/24578; G06F 3/0484; G06F 16/285; G06F 16/2465; G06F 3/0482
(Continued)

(56) References Cited

U.S. PATENT DOCUMENTS 8,788,405 B1 * 7/2014 Sprague ................. G06Q 40/00
 705/38
8,788,407 B1 * 7/2014 Singh ................... G06Q 40/123
 705/38
(Continued)

OTHER PUBLICATIONS

U.S. Pat. No. 10,489,391, Systems and Methods for Grouping and Enriching Data Items Accessed From One or More Databases for Presentation in a User Interface, Nov. 26, 2019.

*Primary Examiner* — Michael Pham
(74) *Attorney, Agent, or Firm* — Knobbe, Martens, Olson & Bear, LLP

(57) ABSTRACT

Embodiments of the present disclosure relate to a data analysis system for grouping and enriching data items for presentation to an analyst through a user interface. Data items from one or more data sources are combined into memory-efficient clustered data structures, which may be stored as one or more data tables in a database. Analysis and scoring of those clustered data structures can be performed by utilizing various criteria or rules to generate scores, reports, alerts, or conclusions that may aid an analyst in evaluating the clustered data structures. The analysis and scoring may also be added to the clustered data structures which are stored as one or more data tables in a database. The analyst may be prompted to create a dossier format or specification and to additional enrichments to be performed on the raw data items in the clustered data structures. The system may then search, group, or filter the raw data items based on the analyst-defined dossier format, as well as add enrichments to the data. Some examples of enrichments include changing the way the data is displayed, inserting data located in a separate reference table, or ordering data to help construct timelines, histograms, and/or other visualizations based upon the various attributes of the raw data items. The enriched data may be presented to the analyst through (Continued)

a user interface, in the user-defined format or specification in order to allow the analyst to efficiently evaluate the data clusters in the context of, for example, a risky trading investigation.

18 Claims, 12 Drawing Sheets

Related U.S. Application Data

(60) Provisional application No. 62/206,119, filed on Aug. 17, 2015.

(58) Field of Classification Search
USPC .................................................. 707/737, 766
See application file for complete search history.

(56) References Cited

U.S. PATENT DOCUMENTS

| 10,447,712 | B2 | 10/2019 | Visbal et al. |
| 10,489,391 | B1 | 11/2019 | Tomlin |
| 2016/0224642 | A1* | 8/2016 | Miller ................. G06F 16/3334 |

\* cited by examiner

SYSTEMS AND METHODS FOR GROUPING AND ENRICHING DATA ITEMS ACCESSED FROM ONE OR MORE DATABASES FOR PRESENTATION IN A USER INTERFACE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/948,936, filed Nov. 23, 2015, and titled "SYSTEMS AND METHODS FOR GROUPING AND ENRICHING DATA ITEMS ACCESSED FROM ONE OR MORE DATABASES FOR PRESENTATION IN A USER INTERFACE," and this application claims benefit of U.S. Provisional Patent Application No. 62/206,119, filed Aug. 17, 2015, and titled "SYSTEMS AND METHODS FOR GROUPING AND ENRICHING DATA ITEMS ACCESSED FROM ONE OR MORE DATABASES FOR PRESENTATION IN A USER INTERFACE". The entire disclosures of each of the above items is hereby made part of this specification as if set forth fully herein and incorporated by reference for all purposes, for all that it contains.

BACKGROUND

Embodiments of the present disclosure are generally related to grouping, enrichment, and presentation of data items accessed from one or more databases, and specifically to grouping, enrichment, and presentation of trade-related data items.

Detection of the occurrence of risky or unauthorized trading, and/or other undesirable behavior occurring within a business is a highly important, but oftentimes challenging task. Trader oversight may be useful for regulatory authorities seeking to make sure traders at the business are complying with laws or regulations. Risky or unauthorized trading may result in significant financial losses to the business and/or additional financial consequences such as penalties paid to regulators.

Detection of risky or unauthorized trading may be performed through the examination of trades performed by traders over time. Previously, determination and identification of risky or unauthorized trading through the examination of trades was a labor intensive task. For example, in an investigation of risky or unauthorized trading, an analyst may have had to pore through numerous collections of data (e.g., trading logs and other trade-related information) comprising hundreds of thousands, millions, tens of millions, hundreds of millions, or even billions of data items, manually discern patterns and perform analyses to gain additional context, and compile any information gleaned from such analyses. The analyst may have to make many decisions regarding selection of electronic data items within an electronic collection of data. Determination and selection of relevant data items within such collections of data may be extremely difficult for the analyst. In addition, such collections of data may consume significant storage and/or memory, and the processing thereof (for example, having an analyst using a computer to sift and/or search through huge numbers of data items) may be extremely inefficient and consume significant processing and/or memory resources.

In some instances related electronic data items may be clustered and stored in an electronic data store. Even when electronic data items are clustered, however, the electronic collection of data may include hundreds of thousands, millions, tens of millions, hundreds of millions, or even billions of clusters of data items. As with individual data items, determination and selection of relevant clusters of data items within such a collection of data may be extremely difficult for the analyst. Further, processing and presenting such clusters of data items in an efficient way to an analyst may be a very challenging task. The data should be presented to the analyst in a way that makes it easy for the analyst to interpret and arrive at conclusions over the potentially risky trading behavior.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a data analysis system (also referred to herein as "the system") that may receive data comprising a plurality of raw data items from one or more data sources. The raw data items may be combined with data from different sources based upon common attributes, in order to provide additional contextual information for the received data. These may include third party sources, other received data of a same data type, and/or other received data of different data types. The data may be grouped into automatically-generated memory-efficient clustered data structures.

As previously mentioned, groups of data clusters may include one or more data items. A data item may include any data, information, or things, such as a person, a place, an organization, an account, a computer, an activity, and event, and/or the like. In an example application, a human analyst may be tasked with deciding whether a trader or person data item represents a trader conducting risky or unauthorized trades. However, an individual data item oftentimes includes insufficient information for the analyst to make such decisions. Rather, the analyst may make better decisions based upon a collection of related data items. For instance, two trades or financial transactions may be related by an identical trader identifier. Or two accounts belonging to one trader may be related by an identical trader identifier or other attribute (e.g., a shared ID number, address, etc.). Some currently available systems assist the analyst by identifying data items that are directly related to an initial data item. For example, the analyst could initiate an investigation with a single suspicious data item or "seed," such as a trader data item possessing the name of a trader or some other identifier for a trader. If the analyst examined this data item by itself, then the analyst would not observe any suspicious characteristics. However, the analyst could request a list of data items related to the seed by a shared attribute, such as a trader identifier. In doing so, the analyst could discover an additional data item, such as trading accounts, which relate to the original trader because of a shared trader identifier. Through the trader identifier, or the attached trading accounts, an analyst could also uncover additional data items related to the seed. For example, the analyst could discover trades or financial transactions, linked to the trader based on a shared trader identifier or linked to the one or more trading accounts based on a shared trader identifier or account identifier. The analyst could then perform risk analysis on all of these trades or transactions and mark individual trades as potentially risky, or even mark the trader associated with the shared trader identifier as a potentially risky trader.

Generation of the memory-efficient clustered data structures may be accomplished selection of an initial data item of interest (also referred to herein as a "seed"), adding of the initial data item to the memory-efficient clustered data structure (or, alternatively, designating the initial data item as the clustered data structure, or an initial iteration of the clustered data structure), and determining and adding one or more related data items to the cluster. In various embodiments, a generated cluster may include far fewer data items than the collection of data described above, and the data items included in the cluster may only include those data items that are relevant to a particular investigation (for example, a risky trading investigation). Accordingly, in an embodiment, processing of the generated cluster may be highly efficient as compared to the collection of data described above. This may be because, for example, a given risky trading investigation by an analyst (for example, as the analyst sifts and/or searches through data items of one or more grouped clusters) may only require storage in memory of a single set of grouped cluster data structures. Further, a number of data items in the group of clusters may be several orders of magnitude smaller than in the entire electronic collection of data described above because only data items related to each other are included in the clusters.

In various embodiments, seeds may be automatically selected/generated according to various seed determination strategies, and clusters of related data items may be generated based on those seeds and according to cluster generation strategies (also referred to herein as "cluster strategies"). Also, as mentioned above, the system may generate a score, multiple scores, and/or metascores for each generated cluster, and may optionally rank or prioritize the generated clusters based on the generated scores and/or metascores. High priority clusters may be of greater interest to an analyst as they may contain related data items that meet particular criteria related to the analyst's investigation. In an embodiment, the system may enable an analyst to advantageously start an investigation with a prioritized cluster, or group of clusters, including many related data items rather than a single randomly selected data item. Further, as described above, the cluster prioritization may enable the processing requirements of the analyst's investigation to be highly efficient as compared to processing of the huge collection of data described above. As mentioned above, this is because, for example, a given investigation by an analyst may only require storage in memory of a limited number of data items associated with a small number of clusters, and further, a number of data items in a cluster may be several orders of magnitude smaller than in the entire electronic collection of data described above because only data items related to each other are included in the cluster.

In various embodiments, grouping of related data clusters enables an analyst to review the data in a logical way. For example, the data clusters may be tagged and grouped according to a person, a type of event, and/or the like. Accordingly, the analyst may be enabled to evaluate all data related to a person in the context of a particular investigation, further increasing the efficiency of the analyst.

In various embodiments, a single master instance of each data item is stored by the system. The master instance of each data item includes all metadata and other information associated with the data item, as well as a unique data item identifier. When generating clusters and groups of clusters, in some embodiments, the master instances of the data items are referenced by their data item identifiers rather than making copies of the data items in each cluster. This advantageously enables memory savings and the data items do not have to be copied multiple times. Additionally, any updates to a master data item may be rapidly propagated to all references of the data item in each cluster, thus reducing processing requirements.

Embodiments of the present disclosure also relate to automated scoring, sorting, of prioritizing of the groups of clustered data structures, automatically analyzing those clustered data structures, storing the scoring or analysis in the clustered data structures (such as within a database), and providing data items within the clustered data structures—such as the results of the automated analysis—to an user interface in an optimized way to an analyst. The automated analysis of the clustered data structures (also referred to herein as "data item clusters," "data clusters," or simply "clusters") may include an automated application of various criteria or rules so as to generate scores, alerts, conclusions, and so forth, which can also be stored within the clustered data structures.

Embodiments of the present disclosure also relate to allowing an analyst to specify how groups of data clusters (referred to herein as "dossiers") may be presented in a dossier user interface. For example, a front-end or configuration user interface may be provided for the analyst to use reference fields and create a dossier format that specifies how the data in a dossier may eventually be presented in the dossier user interface. The analyst may also be prompted to implement one or more enrichments on the data clusters. Based on the analyst's inputs, the data analysis system may perform one or more enrichments on the data clusters. The one or more enrichments may be used to dynamically enhance, re-group, and/or filter the data in the dossiers for presentation in the dossier user interface so as to enable an analyst to quickly navigate among information in the various dossiers and efficiently evaluate the dossiers in the context of, for example, a risky trading investigation.

In some embodiments, the one or more enrichments may be used to analyze or group raw data items (based on, for example, common attributes) in order to construct one or more visualizations, such as one or more timelines, histograms, and/or other visualizations to be presented in the dossier user interface. The presentation of such visualizations may be specified in the dossier format and configured by the user through a configuration user interface. Such visualizations may allow the user to detect patterns and visualize a distribution of raw data items over time or over particular attributes, in order to identify data items or groups of data items that are of interest or otherwise deserving of further analysis. In some embodiments, different types of visualizations may be displayed concurrently, wherein actions performed on one visualization (e.g., drill down) may be automatically reflected in the other displayed visualizations. Additionally, in some embodiments the visualizations may incorporate data items of multiple data item types (and/or data items from multiple different sources).

In some embodiments, the one or more enrichments specified by the user may be used to retrieve, package or combine data located in various data tables of a database or one or more data sources. Thus, data items in the data clusters may be searched and additional enrichments may be applied against the received data items. A user may also, in some embodiments, pre-apply one or more enrichments to a search, such that the search will be executed and the selected enrichments automatically applied to the retrieved search results. For example, raw data items may be searched across various data tables in a database or one or more data sources, and the system may perform user-defined enrichments that automatically interpolate or combine data between the various data tables.

In some embodiments, the dossier format defined by the user may also be used with the one or more enrichments in order to filter the data contained in the clustered data sources in order to extract or obtain only the relevant data needed to fulfill the dossier format defined by the user. Thus, the data can undergo filtering to eliminate non-relevant raw data items, such as by running the data against a whitelist and/or one or more rules.

In some embodiments, the one or more enrichments may be used in order to display data in a different format or structure when presented to the user through the dossier user interface. In some embodiments, the one or more enrichments may be used in order to enrich the data for providing additional context to a user when the enriched data is presented to the user through the dossier user interface. For example, the user may be able to configure an enrichment that specifies a custom format for how large amount values are displayed. For example, the user may specify a format for presenting total account value as "120 M" rather, than a longer version such as "$120,227,513," such that the user may more easily interpret the value of a trading account.

In various embodiments, a computer system is disclosed that comprises one or more computer readable storage devices and one or more one or more hardware computer processors in communication with the one or more computer readable storage devices. The one or more computer readable storage devices are configured to store a plurality of computer executable instructions and a plurality of raw data items, wherein a raw data item is associated with one or more attributes. The one or more hardware computer processors are configured to execute the plurality of computer executable instructions in order to cause the computer system to: identify a data item lead from the plurality of raw data items; receive one or more search parameters based at least in part upon an attribute associated with the data item lead; query the plurality of raw data items based at least in part upon the received search parameters to identify a group of raw data items associated with the data item lead; receive a data cluster comprising the group of raw data items; generate a configuration user interface, wherein the configuration user interface contains an input area configured to receive an user input for changing a dossier format or choosing any data enrichments to apply to the data cluster, wherein the dossier format specifies how a dossier is displayed in a dossier user interface, and wherein the dossier comprises the data cluster and any data enrichments applied to the data cluster; generate the dossier, based at least in part upon the dossier format and any data enrichments chosen to be applied; and generate the dossier user interface to display the dossier based on the dossier format.

In some embodiments, the plurality of computer executable instructions further cause the computer system to: perform an analysis on the data cluster based on a scoring strategy; and add the analysis to the data cluster. In some embodiments, the dossier user interface comprises a display area displaying at least a portion of the data of the dossier and their associated attributes in a tabular format. In some embodiments, the dossier user interface comprises a display area displaying a timeline of at least a portion of the data of the dossier organized at least in part by a time-based attribute associated with the portion of the data of the dossier. In some embodiments, the dossier format comprises a plurality of sections, and wherein the dossier user interface is configured to display the dossier according to the plurality of sections of the dossier format. In some embodiments, the plurality of computer executable instructions further cause the computer system to: pack the dossier and the dossier format into a data package; and unpack the data package to obtain the dossier and the dossier format prior to generating the dossier user interface. In some embodiments, the plurality of raw data is stored in one or more data tables in a database. In some embodiments, generating the dossier comprises directly accessing the one or more data tables without an application macro or a user interface. In some embodiments, generating the dossier further comprises querying the raw data stored in the one or more data tables, based at least in part upon the dossier format and any data enrichments chosen to be applied. In some embodiments, one of the data enrichments is a versioning operation for which the user input supplies a first key and a second key, and wherein generating the dossier further comprises grouping and sub-grouping data items in the data cluster and/or the plurality of raw data items based on the first key and the second key.

In various embodiments, a computer system is disclosed that comprises one or more computer readable storage devices and one or more one or more hardware computer processors in communication with the one or more computer readable storage devices. The one or more computer readable storage devices are configured to store a plurality of computer executable instructions and a plurality of raw data items, wherein a raw data item is associated with one or more attributes. The one or more hardware computer processors are configured to execute the plurality of computer executable instructions in order to cause the computer system to: identify a data item lead from the plurality of raw data items; receive one or more search parameters based at least in part upon an attribute associated with the data item lead; query the plurality of raw data items based at least in part upon the received search parameters to identify a group of raw data items associated with the data item lead; receive a data cluster comprising the group of raw data items; receive a user-defined code, wherein the user-defined code: specifies a dossier format, wherein the dossier format specifies how a dossier is displayed in a dossier user interface, and wherein the dossier comprises the data cluster and any data enrichments applied to the data cluster; and configures any data enrichments to apply to the data cluster; generate the dossier, based at least in part upon the dossier format and any data enrichments configured to be applied; and generate the dossier user interface to display the dossier based on the dossier format.

In some embodiments, the plurality of computer executable instructions further cause the computer system to: perform an analysis on the data cluster based on a scoring strategy; and add the analysis to the data cluster. In some embodiments, the dossier user interface comprises a display area displaying at least a portion of the data of the dossier and their associated attributes in a tabular format. In some embodiments, the dossier user interface comprises a display area displaying a timeline of at least a portion of the data of the dossier organized at least in part by a time-based attribute associated with the portion of the data of the dossier. In some embodiments, the dossier format comprises a plurality of sections, and wherein the dossier user interface is configured to display the dossier according to the plurality of sections of the dossier format. In some embodiments, the plurality of computer executable instructions further cause the computer system to: pack the dossier and the dossier format into a data package; and unpack the data package to obtain the dossier and the dossier format prior to generating the dossier user interface. In some embodiments, the plurality of raw data is stored in one or more data tables in a database. In some embodiments, generating the dossier comprises directly accessing the one or more data tables without an application macro or a user interface. In some embodiments, generating the dossier further comprises querying the raw data stored in the one or more data tables, based at least in part upon the dossier format and any data enrichments chosen to be applied. In some embodiments, one of the data enrichments is a versioning operation for which the user-defined code supplies a first key and a second key, and wherein generating the dossier further comprises grouping and sub-grouping data items in the data cluster and/or the plurality of raw data items based on the first key and the second key.

In various embodiments, computer-implemented methods are disclosed in which, under control of one or more hardware computing devices configured with specific computer executable instructions, one or more aspects of the above-described embodiments are implemented and/or performed.

In various embodiments, a non-transitory computer-readable storage medium storing software instructions is disclosed that, in response to execution by a computer system having one or more hardware processors, configure the computer system to perform operations comprising one or more aspects of the above-described embodiments.

Advantageously, according to various embodiments, the disclosed techniques provide a more effective starting point and user interface for an investigation of data items of various types. An analyst may be able to start an investigation from a group of clusters of related data items instead of an individual data item, which may reduce the amount of time and effort required to perform the investigation. In each case, the processing and memory requirements of such an investigation may be significantly reduced due to the creation and use of highly efficient cluster data structures of related data items.

Further, as described herein, a data analysis system may be configured and/or designed to generate user interface data useable for rendering the various interactive user interfaces described. This user interface data may be used by the system, and/or another computer system, device, and/or software program (for example, a browser program); to render the interactive user interfaces. The interactive user interfaces may be displayed on, for example, electronic displays (including, for example, touch-enabled displays). The format of the dossier user interface data may be specified by the user in a dossier format. Thus, the user may be able to configure portions of the dossier user interface, such as the text or various tables, to be presented in a format that is optimal for that user personally.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for an analyst user.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components (for example, retrieval of data item clusters), automatic and dynamic execution of complex processes in response to the input delivery (for example, grouping and filtering of data item clusters), automatic interaction among various components and processes of the system, and/or automatic and dynamic updating of the user interfaces. The interactions and presentation of data via the interactive user interfaces described herein may accordingly provide cognitive and ergonomic efficiencies and advantages over previous systems.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
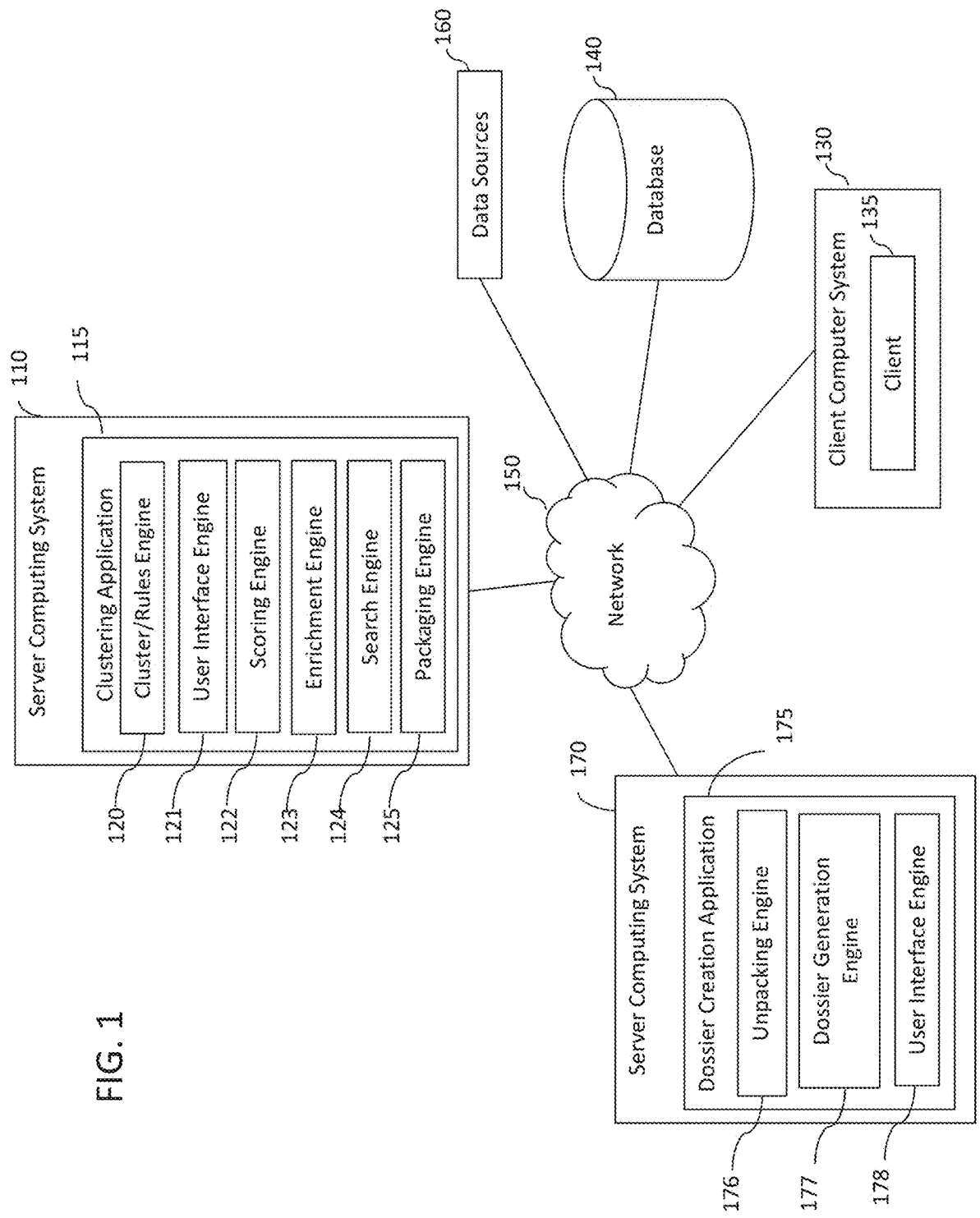
FIG. 1 is a block diagram illustrating a high-level view of an example data analysis system, according to one embodiment of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (for example, Oracle database, mySQL database, and the like), spreadsheets, XML files, and text files, among others. A database may include, in some implementations, one or more tables of data (also referred to herein as "data tables"). The various terms "database," "data store," and/or "data source" may be used interchangeably in the present disclosure.

Data Item (Item), Data Object (Object), or Data Entity (Entity): A data container for information representing a specific thing, or a group of things, in the world. A data item may be associated with a number of definable properties (as described below). For example, a data item may represent an item such as a person, a place, an organization, an account, a computer, an activity, a market instrument, or other noun. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data item," "data object," "data entity," "item," "object," and "entity" may be used interchangeably and/or synonymously in the present disclosure.

Raw Data Item: A data item that has not yet been enriched by the data analysis system. A raw data item may belong to a data cluster. A raw data item may include data received from one or more data sources, but it may also include data obtained through observation, calculation, or computation. For example, the data analysis system may perform analysis or scoring on a data item or a data cluster. The analysis or scoring results may be a data item that is itself stored within the analyzed data cluster, and would be considered a raw data item since it has not been enriched.

Data Item Lead: A raw data item that has a calculated score, metascore, or alert level above a certain threshold, or has otherwise been flagged or designated for further analysis.

Item (or Entity or Object) Type: Type of a data item (for example, Person, Event, or Document). Data item types may be defined by an ontology and may be modified or updated to include additional data item types. An data item definition (for example, in an ontology) may include how the data item is related to other data items, such as being a sub-data item type of another data item type (for example, an agent may be a sub-data item of a person data item type), and the properties the data item type may have.

Properties: Also referred to herein as "attributes" or "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Seed: One or more data items that may be used as a basis, or starting point, for generating a cluster. A seed may be generated, determined, and/or selected from one or more sets of data items according to a seed generation strategy. For example, seeds may be generated from data items accessed from various databases and data sources including, for example, databases maintained by financial institutions, government items, private items, public items, and/or publicly available data sources.

Cluster: A group or set of one or more related data items/objects/items. A cluster may be generated, determined, and/or selected from one or more sets of data items according to a cluster generation strategy. A cluster may further be generated, determined, and/or selected based on a seed. For example, a seed may comprise an initial data item of a cluster. Data items related to the seed may be determined and added to the cluster. Further, additional data items related to any clustered data item may also be added to the cluster iteratively as indicated by a cluster generation strategy. Data items may be related by any common and/or similar properties, metadata, types, relationships, and/or the like. Clusters may also be referred to herein as "clustered data structures," "data item clusters," and "data clusters."

Seed/Cluster Generation Strategy (also referred to herein as Seed/Cluster Generation Rule(s)): Seed and cluster generation strategies/rules indicate processes, methods, and/or strategies for generating seeds and generating clusters, respectively. For example, a seed generation strategy may indicate that data items having a particular property (for example, traders selected from a list of traders) are to be designated as seeds. In another example, a cluster generation strategy may indicate that data items having particular properties in common with (or similar to) a seed or other data item in a cluster are to be added to the cluster. Seed and/or cluster generation strategies may specify particular searches and/or rule matches to perform on one or more sets of data items. Execution of a seed and/or cluster generation strategy may produce layers of related data items. Additionally, a seed/cluster generation strategy/rule may include multiple strategies, sub-strategies, rules, and/or sub-rules.

Dossier: A group of data clusters. May also include data enrichments (also referred to herein as "enrichments") to the group of data clusters. In various embodiments, as described below, a dossier can be generated for an analyst to review in order to spot potentially risky trading behavior. For example, the analyst can specify various enrichments to perform on a group of data clusters, such as data clusters generated from trader seeds and containing trade-related data associated with the trader. The system may group the relevant data within the clusters, perform specified enhancements, and/or, based on a dossier format, display the dossier in an interactive dossier user interface.

Dossier Format: A template or format according to which a dossier (including any data enrichments) may be displayed in an interactive dossier user interface. A dossier format may be user specified and/or automatically generated (e.g., based on a default template). For example, the user may specify a dossier format via a configuration user interface. A dossier format may be specific to a type of dossier (and/or, e.g., a cluster generation strategy).

Configuration User Interface: An interactive user interface that allows an analyst to specify a dossier format for displaying data from a dossier. May also allow an analyst to specify enrichments to be applied to data in the dossier.

Dossier User Interface: An interactive user interface that includes a dossier and its contents, displayed according to an associated dossier format. As mentioned above, the dossier may include data enrichments associated with the group of clusters of the dossier, which may be included in the dossier user interface.

Inventive Realizations

In the context of trader oversight, a data analysis system may aggregate data from various trade sources, apply logic to the data to identify risky traders or risky actions, and generate alerts. An example of an alert would be a notification to a human analyst that a Trader A did something risky at X time. The alert may additionally include more detailed data on the action taken by Trader A that was identified by the data analysis system as risky. The analyst may be tasked with reviewing these alerts and the trades conducted by traders in order to monitor for risky or unauthorized trades.

Human analysts may be well-suited at spotting operational risk when the trade-related data is presented in an easily-interpreted fashion via an interactive user interface. From experience, the analysts may arrive at a deep understanding of the trade-related data and have an understanding of an ideal format for how the trade-related data should be presented, in order to optimize their own individual ease of interpreting that data. However, the analysts may lack the technical know-how to write the strategies or code maps necessary to group/cluster the relevant data and present it in the desired format.

These analysts may require a more technical person to generate the relevant data clusters/groupings and the presentation formats for the data. The analysts may then have to work closely with the technical person to brief the technical person on their individual preferences for how the trade-related data should be presented. The technical person may then manually update and, if needed, recompile the system to reflect the analysts' preference. This process of updating the system can be inefficient and time consuming.

Certain embodiments of the disclosure include the inventive realization that an improved data analysis system can remove this bottleneck of requiring a technically-savvy person to generate clustering strategies, data enrichments, and display formats (e.g., dossier formats, or how they want the trade-related data to be presented to them in a dossier), by instead allowing the non-technical analysts to generate their own clustering strategies, data enrichments, and/or dossier formats (among other aspects), import the relevant data to be displayed based on their own specifications, and then finally review the dossiers or presented data clusters for trading risk (and/or any other analysis).

Certain embodiments of the disclosure also include the inventive realization that one way of allowing analysts to specify clustering strategies, data enrichments, dossier formats, etc., is through an interactive configuration user interface. This interactive configuration user interface may be a separate software front end or software application that is capable of efficiently integrating with one or more databases. Such an interactive configuration user interface may be preferable to having purely a backend or requiring the analyst to use code. The interactive configuration user interface may have a shorter learning curve and be easier for a non-technical person to pick up and use. The interactive configuration user interface may receive analyst input and then translate it into code or a code map. Alternatively, the clustering strategies, data enrichments, dossier formats, etc. may be specified using code. This code may be entered in to a stand-alone, back-end software application that may be separate from, or integrated with, the databases.

Certain embodiments of the disclosure also include the inventive realization that after obtaining an analyst-defined (and/or default or automatically generated) specification or format (e.g., a dossier format) for a dossier, the system may search and gather only the relevant data within the data clusters for presenting in accordance with the dossier format. The data may be located in various databases. Some data items or attributes may be in separate reference databases. The system may automatically access and gather the data found in the separate reference databases. The system may provide the analyst the ability to join data found in these separate reference databases in order to populate any reference fields specified in the dossier format.

Certain embodiments of the disclosure also include the inventive realization that additional enrichments can be performed on the gathered data. These enrichments may be performed on the gathered data prior to submitting that data to the user interface for display. Some examples of such enrichments include combining data from various external or separate databases, changing the way numbers are displayed, and/or categorizing or ordering data items in order to allow the analyst more insight into a chronology of events.

Certain embodiments of the disclosure also include the inventive realization that quick iteration times for the system can be obtained by improving the speed and efficiency in which enrichments are applied to the raw data in the data clusters. This may be done by providing the system with low-level access to certain databases. The enrichments may actually occur within the program used to access the databases, such as through a macro, or the enrichments may be performed outside the program used to access the databases. In the later scenario, low-level access to the databases may be used by the system in order to improve computing speed or efficiency through various means, such as by bypassing any interface associated with the databases.

Overview

This disclosure relates to a data analysis system (also referred to herein as the "system") which may receive data contained in one or more databases or aggregated from various databases and/or other data sources. Memory-efficient clustered data structures (also referred to herein as "clusters") of related data items may be automatically generated, analyzed, and scored. Such alerts, flags, conclusions, and scoring may be included in the data clusters.

The data analysis system may include one or more configuration user interfaces through which the analyst may specify how the data in the data clusters is to be presented. As described below and above, data from the data clusters is generally presented as a "dossier" that includes various pre-defined elements via an interactive dossier user interface. The organization of these pre-defined elements, and particular data from the data clusters that is to be shown within these pre-defined elements, may be unique to a clustering strategy, and optionally may be specified as by the analyst via the one or more configuration user interfaces described herein. The analyst may be able to specify, for example, a dossier format (e.g., a template or specification, as described above) for a dossier without needing technical know-how. The configuration user interfaces may allow for the data aggregated from the one or more databases to be quickly iterated into a dossier, and may also allow for enrichments to be applied to the data before it is presented to the analyst.

Generation of clusters may begin by automatic generation, determination, and/or selection of an initial data item of interest, called a "seed." As mentioned above, a data item may include any data, information, or things, such as a person, a place, an organization, an account, a computer, an activity, and event, and/or the like. Seeds may be automatically selected/generated according to various seed determination strategies, and clusters of related data items may be generated based on those seeds and according to cluster generation strategies (also referred to herein as "cluster strategies," "clustering strategies," and/or "cluster generation rules"). Seeds and related data items may be accessed from various databases and data sources including, for example, databases maintained by financial institutions, government entities, private entities, public entities, and/or publicly available data sources. Such databases and data sources may include a variety of information and data, such as, for example, personal information, financial information (including financial transactions or financial instrument information), tax-related information, computer network-related data, and/or computer-related activity data, among others. Further, the databases and data sources may include various relationships that link and/or associate data items with one another. Various data items and relationships may be stored across different systems controlled by different items and/or institutions. According to various embodiments, the data analysis system may bring together data from multiple data sources in order to build clusters.

The automated analysis of the clusters may further include an automated application of various criteria, rules, indicators, or scenarios so as to generate a compact, human-readable analysis of the data clusters. The human-readable analyses (also referred to herein as "summaries" or "conclusions") of the data clusters may be organized into a dossier user interface so as to enable an analyst to quickly navigate among information associated with various data clusters and efficiently evaluate those data clusters in the context of, for example, a risky trading investigation. Embodiments of the present disclosure also disclose automated scoring of the clustered data structures by the data analysis system. The dossier user interface may be updated based on the scoring, directing the human analyst to more critical data clusters (for example, data clusters more likely to be associated with a certain type of risky behavior) in response to the analyst's inputs.

In various embodiments, the data analysis system may enable an analyst to efficiently perform analysis and investigations of various data clusters and related data items. For example, the system may enable an analyst to perform various financial and security investigations of data clusters of related data items. In such an investigation, the system may automatically create clusters of related data items, generate human-readable conclusions of the clusters, score those clusters, and generate a dossier user interface in which, in response to inputs from the analyst, information related to the clusters may be efficiently provided to the analyst. For example, a trader may be a seed that is linked by the system to various data items including, for example, trader identifiers, trade-related data, trading accounts and/or trading books associated with the trader. Further, the system may link, for example, various other traders and counterparties that transacted with the trader identifier, to the seed trader. Accordingly, in various embodiments, the system may automatically cluster of various layers of data items related to the seed trader. One or more rules or criteria may then automatically be applied to the cluster so as to generate one or more compact, human-readable analyses (also referred to herein as "summaries" or "conclusions") of the data clusters. The human-readable analyses may comprise phrases or sentences that provide highly relevant, and easily evaluated (by a human), information regarding the data in the cluster (for example, data items and metadata). For example, a conclusion in the current example may be "4 traders are associated with the current cluster," or "The 2 trading accounts in the cluster have been used in 30 different trades." Such conclusions in an investigation may, in an embodiment, enable the analyst to determine a likelihood of risky activity associated with the cluster. Further, the data items of the cluster may then be linked to possible risky activity. For example, the seed trader, linked trading accounts, and associated trade-related data may all be linked to the potentially risky activity. As mentioned above, in such an investigation the analyst may efficiently determine likely risky behavior, as well as discover relationships between trades, trade-related data, and the seed trader through several layers of related data items. Such techniques, enabled by various embodiments of the data analysis system, may be particularly valuable for investigations in which relationships between data items may include several layers, and in which such relationships may be otherwise very difficult or impossible to manually identify.

In various embodiments, the data analysis system may automatically generate, or determine, seeds based on a seed generation strategy (also referred to as "seed generation rules"). For example, for a particular set of data items, the data analysis system may automatically generate, based on a seed generation strategy, seeds by designating particular data items (and/or groups of data items) as seeds. Examples of various seed generation strategies are described below.

Further, in various embodiments, the data analysis system may automatically discover data items related to a seed, and store the resulting relationships and related data items together in a "cluster" (or, alternatively, designating the seed as the initial cluster (or initial data item of the cluster) and adding the discovered data items of the cluster). A cluster generation strategy may specify particular searches to perform at each step of an investigation, or cluster generation, process. Such searches may produce layers of related data items to add to the cluster. Further, according to an embodiment, multiple clusters may be merged and/or collapsed into a single cluster when the multiple clusters share one or more common data items and/or properties. Thus, according to an embodiment, an analyst may start an investigation with the resulting cluster, rather than the seed alone. Starting with the cluster, and associated human-readable conclusions, the analyst may form opinions regarding the related data items, conduct further analysis of the related data items, and/or may query for additional related data items.

According to various embodiments, the data analysis system may further generate various "cluster scores." Cluster scores may include scores based on various characteristics and/or attributes associated with the cluster and/or the various data items of the cluster. In various embodiments, the data analysis system may also generate "cluster metascores" which may include, for example, an overall cluster score. Cluster metascores may, for example, be based on a combination of cluster scores of a cluster associated with a seed. In an embodiment, the system may further generate "alert scores." Alert scores may be the same as, similar to, and/or based on any of the cluster scores, metascores, and/or conclusions described herein. In an embodiment, the alert score may be a metascore, and may be one of multiple values corresponding to, for example, a high alert, a medium alert, or a low alert. The alert score is described in further detail below. Further, cluster scores may be based on one or more generated conclusions related to the cluster, and/or the conclusions may be generated based on cluster scores.

According to various embodiments, the data analysis system may perform analysis on the data clusters and generate cluster scores and/or flag data clusters based on indicators or scenarios. Indicators may be pre-defined rules, strategies, or criteria for analyzing relationships between data in a data cluster. Indicators may be a data cluster scoring strategy. For example, one indicator may be a method for detecting the presence of PNL smoothing, a situation which may be associated with risky trading behavior. The data cluster may include the PNL data or account equity data over time for a given trader serving as the seed. That indicator may calculate the variation of that data over a time frame, in order to spot artificial smoothing in the curve, and then either flag the data cluster for the presence of PNL smoothing or generate a cluster score associated with PNL smoothing that represents the likelihood that PNL smoothing occurred. Scenarios may be pre-defined rules, strategies, or criteria for analyzing combinations of indicators and/or their associated cluster scores—also for the purpose of analyzing relationships between data in a data cluster. For example, one indicator may compare the trade time for a given trade conducted by a trader seed against a building's security badge activity of that trader. If the trade did not occur during the time when the trader was physically badged-in at a secure trading location, it may indicate suspicious trading activity. One scenario may be a method of analyzing patterns or recurring suspicious trading activity of this sort, in order to more definitively determine whether a trader is actively engaging in trading without being badged-in (or sharing their trading account with someone else).

Further, in various embodiments, for a particular set of data items, multiple clusters may be generated by the data analysis system. For example, the data analysis system may generate multiple seeds according to a seed generation strategy, and then multiple clusters based on those seeds (and based on a cluster generation strategy). In such embodiments, the data analysis system may prioritize the multiple generated clusters based upon cluster scores and/or cluster metascores. In an embodiment, the data analysis system may provide a dossier user interface including a display of human-readable conclusions of the clusters, cluster scores, cluster metascores, and/or various other cluster information. Such a dossier user interface may be organized according to a prioritization of clusters. In various embodiments, cluster prioritization may assist an analyst in selecting particular clusters to investigate.

In various embodiments, the dossier user interface generated by the system may provide a list of clusters according to one or more alert scores (as mentioned above and described in detail below). Further, in response to an analyst selecting a cluster, information associated with the cluster may be provided to the analyst. For example, the analyst may be provided with a name of the cluster, a cluster strategy by which the cluster was generated, a list of generated conclusions, and/or one or more lists or tables of data related to the cluster. For example, the one or more lists or tables of data related to the cluster may be drawn from the data items of the cluster, and may be filtered by the analyst according to time and/or type of data. In an embodiment, various generated clusters in the dossier user interface may be organized according to clustering strategies whereby each of the clusters were generated. In an embodiment, a cluster type may be associated with each cluster, and may be determined according to the cluster strategy that generated the cluster.

As mentioned above, in various embodiments, a generated cluster may include far fewer data items than are included in a full source database and/or references to master instances of data items, and the data items included in the cluster may only include those data items that are relevant to a particular investigation (for example, a risky trading investigation). Accordingly, in an embodiment, processing of the generated cluster may be highly efficient as compared to the collection of data described above. This may be because a risky trading investigation by an analyst may only require storage in memory of a single cluster data structure. Further, a number of data items in a cluster may be several orders of magnitude smaller than in the entire electronic collection of data described above because only data items related to each other are included in the cluster.

Additionally, the automated analysis and scoring of clusters (as mentioned above) may enable highly efficient evaluation of the various data clusters by a human analyst. For example, the dossier user interface is generated so as to enable an analyst to quickly view critical data clusters (as determined by the automated scoring), and then in response to analyst inputs, view and interact with the generated information (including, for example, the human-readable conclusions) associated with the clusters. In response to analyst inputs, the dossier user interface may be updated to display data associated with each of the generated clusters if the analyst desires to dive deeper into data associated with a given cluster.

In various embodiments, the data analysis system may be used in various data analysis applications. Such applications may include, for example, trader oversight, financial fraud detection, tax fraud detection, beaconing malware detection, malware user-agent detection, other types of malware detection, activity trend detection, health insurance fraud detection, financial account fraud detection, detection of activity by networks of individuals, criminal activity detection, network intrusion detection, detection of phishing efforts, money laundering detection, and/or financial malfeasance detection. Examples of many of the above-mentioned data analysis applications, including methods and systems for identifying data items, generating data clusters, and analyzing/scoring clusters, are disclosed in the various related applications listed above and previously incorporated by reference herein.

As mentioned in reference to various features of the disclosure below, this application is related to U.S. patent application Ser. No. 14/139,628, titled "TAX DATA CLUSTERING," and filed Dec. 23, 2013; U.S. patent application Ser. No. 14/139,603, titled "MALWARE DATA CLUSTERING," and filed Dec. 23, 2013; U.S. patent application Ser. No. 14/139,713, titled "USER-AGENT DATA CLUSTERING," and filed Dec. 23, 2013; U.S. patent application Ser. No. 14/139,640, titled "TREND DATA CLUSTERING," and filed Dec. 23, 2013; U.S. patent application Ser. No. 14/251,485, titled "FRAUD DETECTION AND SCORING," and filed Apr. 11, 2014; U.S. patent application Ser. No. 14/278,963, titled "CLUSTERING DATA BASED ON INDICATIONS OF FINANCIAL MALFEASANCE," and filed May 15, 2014; U.S. patent application Ser. No. 14/639,606, titled "AUTOMATED DATABASE ANALYSIS TO DETECT MALFEASANCE," and filed Mar. 5, 2015; U.S. patent application Ser. No. 14/616,080, titled "MALICIOUS SOFTWARE DETECTION IN A COMPUTING SYSTEM," and filed Nov. 6, 2014; U.S. patent application Ser. No. 14/473,552, titled "DATA ITEM CLUSTERING AND ANALYSIS," and filed Aug. 29, 2014; U.S. patent application Ser. No. 14/473,920, titled "EXTERNAL MALWARE DATA ITEM CLUSTERING AND ANALYSIS," and filed Aug. 29, 2014; U.S. patent application Ser. No. 14/473,860, titled "MALWARE DATA ITEM ANALYSIS," and filed Aug. 29, 2014; and U.S. Provisional Patent Application No. 62/045,488, titled "SYSTEM FOR PROVIDING DYNAMIC LINKED PANELS IN USER INTERFACE," and filed Sep. 3, 2014; U.S. patent application Ser. No. 14/579,752, titled "SYSTEMS AND USER INTERFACES FOR DYNAMIC AND INTERACTIVE INVESTIGATION OF BAD ACTOR BEHAVIOR BASED ON AUTOMATIC CLUSTERING OF RELATED DATA IN VARIOUS DATA STRUCTURES," and filed Dec. 22, 2014. The entire disclosure of each of the above items is hereby made part of this specification as if set forth fully herein and incorporated by reference for all purposes, for all that it contains.

In the following description, numerous specific details are set forth to provide a more thorough understanding of various embodiments of the present disclosure. However, it will be apparent to one of skill in the art that the systems and methods of the present disclosure may be practiced without one or more of these specific details.

Examples of Data Items, Properties, and Links

In various embodiments, different types of data items may have different property types. For example, a "Person" data item may have an "Eye Color" property type and an "Event" data item may have a "Date" property type. Each property as represented by data in a database may have a property type defined by an ontology used by the database. Further, data items may be instantiated in a database in accordance with a corresponding object definition for the particular data item in the ontology. For example, a specific monetary payment (for example, an item of type "event") of US$30.00 (for example, a property of type "currency" having a property value of "US$30.00") taking place on Mar. 27, 2009 (for example, a property of type "date" having a property value of "Mar. 27, 2009") may be stored in the database as an event object with associated currency and date properties as defined within the ontology.

Data objects defined in an ontology may support property multiplicity. In particular, a data item may be allowed to have more than one property of the same property type. For example, a "Person" data object may have multiple "Address" properties or multiple "Name" properties or multiple "Account" properties.

A link represents a connection between two data items and may be through any of a relationship, an event, and/or matching properties. A link may be asymmetrical or symmetrical. For example, "Person" data item A may be connected to "Person" data item B by a "Child Of" relationship (where "Person" data item B has an asymmetric "Parent Of" relationship to "Person" data item A), a "Kin Of" symmetric relationship to "Person" data item C, and an asymmetric "Member Of" relationship to "Organization" data item X. As an another example, "Person" or "Trader" data item A may be connected to a "Person" or "Trader" data item B by a "Counterparty" relationship (as a result of Person A and Person B having been counterparties to a trade). The type of relationship between two data items may vary depending on the types of the data items. For example, "Person" data item A may have an "Appears In" relationship with "Document" data item Y or have a "Participate In" relationship with "Event" data item E. As an example of an event connection, two "Person" data items may be connected by an "Airline Flight" data item representing a particular airline flight if they traveled together on that flight, or by a "Meeting" data item representing a particular meeting if they both attended that meeting. In one embodiment, when two data items are connected by an event, they are also connected by relationships, in which each data item has a specific relationship to the event, such as, for example, an "Appears In" relationship.

As an example of a matching properties connection, two "Person" data items representing a brother and a sister may both have an "Address" property that indicates where they live. If the brother and the sister live in the same home, then their "Address" properties likely contain similar, if not identical property values. In one embodiment, a link between two data item may be established based on similar or matching properties (for example, property types and/or property values) of the data item. These are just some examples of the types of connections that may be represented by a link and other types of connections may be represented; embodiments are not limited to any particular types of connections between data items. For example, a document may contain references to two different items. For example, a document may contain a reference to a payment (one data item), and a person (a second data item). A link between these two data items may represent a connection between these two items through their co-occurrence within the same document.

Each data item may have multiple links with another data item to form a link set. For example, two "Person" data items representing a husband and a wife may be linked through a "Spouse Of" relationship, a matching "Address" property, and/or one or more matching "Event" properties (for example, a wedding). Each link, as represented by data in a database, may have a link type defined by the database ontology used by the database.

In various embodiments, the data analysis system may access various data items and associated properties from various databases and data sources. Such databases and data sources may include a variety of information and data, such as, for example, personal information (for example, names, addresses, phone numbers, personal identifiers, and the like), financial information (for example, financial account information, transaction information, balance information, and the like), tax-related information (for example, tax return data, and the like), computer network-related data (for example, network traffic information, IP (Internet Protocol) addresses, user account information, domain information, network connection information, and the like), and/or computer-related activity data (for example, computer events, user actions, and the like), among others.

Example Embodiments of the Data Analysis System

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure described above and/or below may include several novel features, no single one of which is solely responsible for its desirable attributes or which is essential to practicing the embodiments of the disclosure herein described.

FIG. 1 is a block diagram illustrating an example network environment of the data analysis system, according to one embodiment. As shown in the embodiment of FIG. 1, the network environment includes server computing systems 110 and 170, a database 140 (which, in some embodiments, may include multiple databases), one or more data sources 160, a client computing system 130, and a network 150. In some embodiments, one or more of the server computing system 110, the server computing system 170, and/or the database 140 may be combined into a single computing device/system (which may be referred to as, e.g., the data analysis system), and/or may be further divided into multiple computing devices/systems (which, collectively, may be referred to as, e.g., the data analysis system). Accordingly, in general the term "data analysis system," as used herein, refers to this collection of system and/or devices and their associated functionality (as described herein) in any suitable arrangement. As shown in FIG. 1, the example network environment further includes a clustering software application 115 running on the server computing system 110, a dossier creation software application 175 running on the server computing system 170, and a client 135 running on the client computer system 130. Further, the various aspects of the example network environment of FIG. 1, including, e.g., client 135, clustering application 115, dossier creation application 175, and database 140 may communicate over a network 150, for example, to access data sources 160.

In some embodiments, the clustering application 115 may include a cluster/rules engine 120, a configuration user interface engine 121, a scoring engine 122, an enrichment engine 123, a search engine 124, and a packaging engine 125. The clustering application 115 may be configured to create data clusters, as well as to enable analysts to create a desired dossier format and perform enrichments on the data within the clustering application 115.

In some embodiments, the dossier creation application 175 may include an unpacking engine 176, a dossier generation engine 177, and a dossier user interface engine 178. The dossier creation application 175 may be configured to create dossiers, as well as to enable analysts to review the dossiers in their desired format through a dossier user interface.

As mentioned above, in some embodiments the clustering application 115 and the dossier creation application 170 may be combined into a single software application, which may run on a single computing system/device of the data analysis system.

In one embodiment, the data sources 160 provide data available to the clustering application 115 for analysis. Such data sources may include any database and/or other data sources including relational data sources, web services data, XML data, and the like. Further, such data sources 160 may include a variety of information and data, for example, personal information, financial information, employment information, computer network-related data, and/or computer-related activity data, among others. The data sources 160 may be related to trading records stored by a financial institution. In such a case, the data sources 160 may include trading account data, trader data, and transaction data. The data of data source 160 may include data attributes such as account numbers, account balances, phone numbers, names, transaction amounts, and the like. Data sources 160 is included to be representative of a variety of data available to the server computer system 110 over network 150, as well as locally available data sources.

In some embodiments, the one or more databases 140 may be Relational Database Management Systems (RDBMS) that stores the data as rows in relational tables. While the database 140 is shown as a distinct database in FIG. 1, database 140 may operate on the same server computing system 110 as the clustering application 115, and/or any other computing system/device of the data analysis system.

In some embodiments, related data stored in database 140 may be stored in one or more data tables. For example, there may be one or more data tables that store scored alerts and information related to each alert. As another example, there may be one or more data tables that store trade-related information. Thus, a data cluster may actually consist of data references and links, and the data that the data cluster is comprised of may actually be stored in one or more data tables in database 140. Alternatively, the data of the one or more data clusters may be stored in other suitable ways in one or more databases of the data analysis system.

The client 135 may represent one or more software applications or modules configured to present data and translate input, from the analyst, into requests for data analyses by clustering application 115. In one embodiment, the client 135 and the clustering application 115 may be embodied in the same software module and/or may be included in the same computing system. In one embodiment, the client 135 and the dossier creation application 175 may be embodied in the same software module and/or may be included in the same computing system. In one embodiment, the client 135, the clustering application 115, and the dossier creation application 175 may be embodied in the same software module and/or may be included in the same computing system. In one embodiment, several clients 135 may execute on the client computer 130, and/or several clients 135 on several client computers 130 may interact with the clustering application 115 and/or dossier creation application 175. In one embodiment, the client 135 may be a browser accessing a web service.

While the client 135, clustering application 115, and dossier creation application 175 are shown running on distinct computing systems, the client 135, clustering application 115, and dossier creation application 175 may all run on the same computing system.

According to an embodiment, cluster/rules engine 120 is configured to receive data for analysis from one or more data sources (e.g., data sources 160) comprising one or more raw items and generate data clusters based on a data clustering strategy. The data clusters may then be stored in a data table(s) or a relational database in database 140.

In an embodiment, scoring engine 122 is configured to analyze or score received raw data items or groupings of raw data items stored in database 140, according to one or more scoring strategies. The score may indicate an importance or priority for further analyzing the raw data items and/or groupings. The score may be related to the likelihood that a data cluster is associated with risky trading behavior. For example, scoring engine 122 may execute one or more scoring strategies that analyze the occurrences of a battery of different types of risky trading behavior, and score the data clusters based on any identified risky trading behavior. The scores may be added to the data clusters or stored within the same data tables, which may be located in database 140.

For example, scoring engine 122 may identify that certain trades are occurring during unusual times (which may be indicative that the trader performing the trades is attempting to avoid scrutiny), and thus scoring engine 122 may associate the data cluster containing those trades with a high score for further analysis. In some embodiments, different scores may be generated based upon different attributes and/or combinations of attributes associated with the data items or groupings of data items, which may then be aggregated to form an overall score or metascore for the data item.

In an embodiment, configuration user interface engine 121 may provide a front-end or configuration user interface, such as those described in embodiments below, for the analyst to specify a dossier format, which is a desired format or template for how the dossier should look when it is presented to them. The configuration user interface may also allow the analyst to specify various enrichments that may be applied to the data in the data clusters. Afterwards, configuration user interface engine 121 may convert the inputs from the analyst into code or instructions that may be utilized with enrichment engine 123 and search engine 124.

In an embodiment, search engine 124 is configured to search, group, or filter for the relevant data in the data clusters, as determined by the analyst-specified dossier format. For example, the analyst may have used the configuration user interface engine 121 to specify that they want their dossier to show the name of a trader, but not the name of any counterparties involved in trades with the trader. The analyst may also not desire any analysis requiring the counterparty data. As a result, search engine 124 may look through the various data tables holding the data cluster in database 140 in order to find all the relevant data that needs to be presented to the analyst. In this case, the relevant data would include the name of the trader but not the names of counterparties. In addition, search engine 124 may receive one or more analyst inputs in order to search through and/or filter the raw data items in the clusters for analysis.

In an embodiment, enrichment engine 123 is configured to apply enrichments specified by the analyst through the configuration user interface engine 121 to the data that is found through search engine 124. The enrichments are described in more detail in the embodiments below, but one example of a enrichment is changing the way that numbers are displayed. For example, a raw data item in the data cluster may involve a trade transaction amount, stored as "$1,200,000". The analyst may choose to apply an enrichment that displays the number instead in a shorter form, such as "$1.2 M". The enriched data would be in this format, so that the dossier user interface can display the data directly without having to also perform changes to the number format.

In some embodiments, enrichment engine 123 may be configured to enrich or supplement retrieved raw data items with additional information. For example, the analyst may specify that he wants the dossier format to include the name of each trader on that trader's dossier. However, the trader data serving as the seed for that data cluster used in creating the dossier may only have a trader identifier number, and not the trader's name. Enrichment engine 123 may be able to access data in other data tables (e.g., in database 140 and/or in other data sources 160) that contain the trader's name linked to the trader's identifier number (such as by accessing trading account data or employment data). Enrichment engine 123 may then map the trader name with the trader identifier number, so that the trader's name can be used to populate the dossier under the specified dossier format that includes the trader's name.

In an embodiment, after the data has been gathered and the enrichments applied, packaging engine 125 may take the enriched data and pack it together with the dossier format. That packaged data may then be sent to the dossier creation application 175 running on server computing system 170 through the network 150.

Within dossier creation application 175, there is an unpacking engine 176, a dossier generation engine 177, and dossier user interface engine 178. Unpacking engine 176 may take the packaged data received from clustering application 115 and unpack it into a format usable by the dossier generation engine 177.

Dossier generation engine 177 may then take both the enriched data and the analyst-defined dossier format from the unpacked data to build dossiers. It may be simple for dossier generation engine 177 to generate the dossier since: the dossier format may be static at this stage, the data being displayed in the dossier has already been enriched and may also be static, and there may be no more calculations to perform (such as risk weighting or alert scoring).

In an embodiment, dossier user interface engine 178 may generate various dossier user interfaces of the data analysis system as described below in various embodiments. In one embodiment, the dossier user interface engine 178 may work in conjunction with dossier generation engine 177 and unpacking engine 176 in order to organize and present enriched data to the analyst in a desired dossier format. Scored clusters or scored raw data items that were calculated through scoring engine 122 may be presented to the analyst according to the assigned scores. The dossier user interfaces may be generated as web applications and/or dynamic web pages displayed within the client 135. The dossier user interfaces are interactive such that an analyst may make selections, provide inputs, and/or manipulate outputs.

Example dossier user interfaces that may be used in some embodiments are discussed in detail below in conjunction with various figures.

Figure 2:
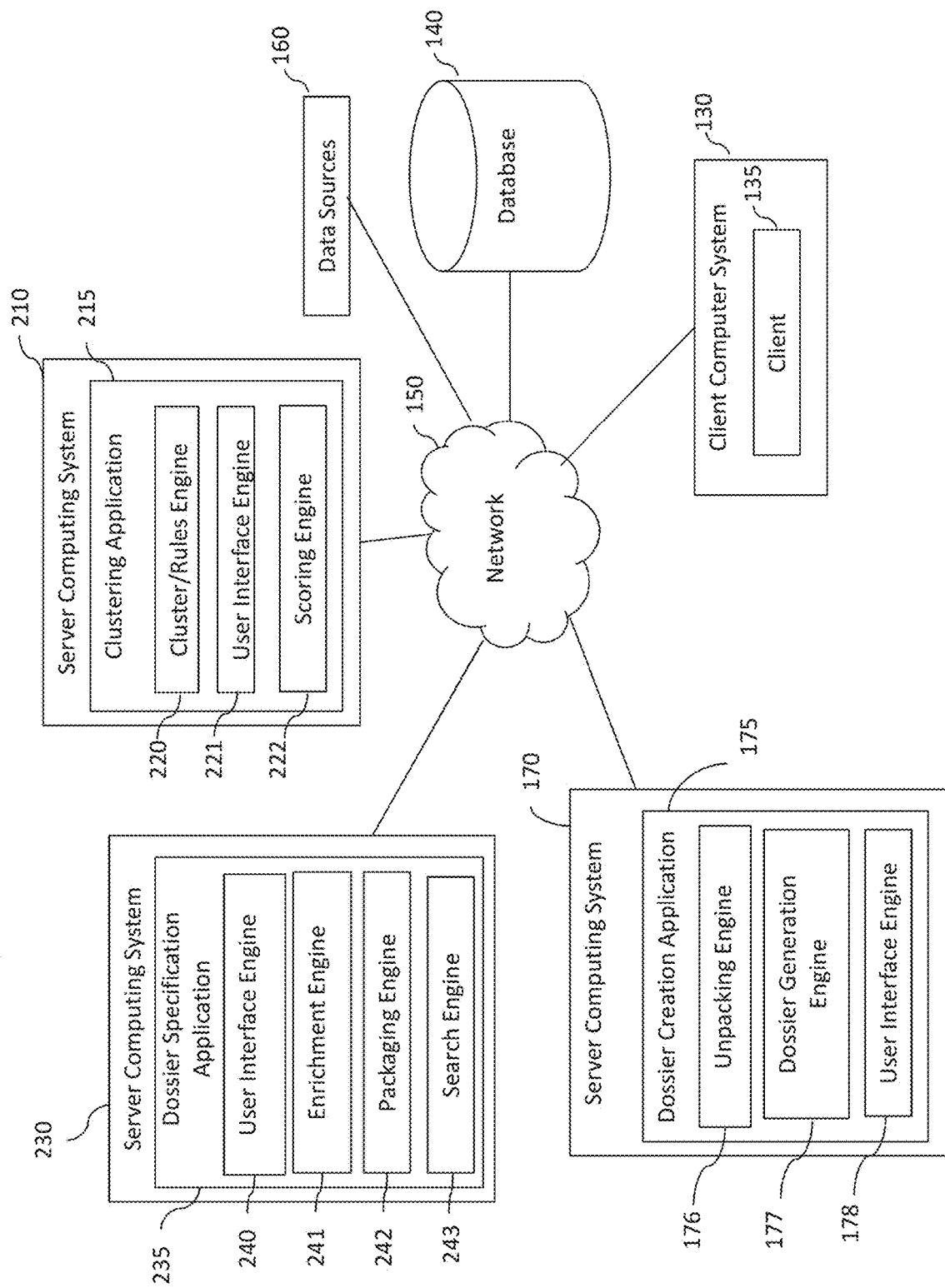
FIG. 2 is another block diagram illustrating a high-level view of an example data analysis system, according to one embodiment of the present disclosure.

FIG. 2 is a block diagram illustrating an example network environment, according to another embodiment. As shown in FIG. 2, the data analysis system may include an additional server computing system, such that it includes server computing systems 210 and 230. In the example of FIG. 2, the tasks of data clustering/scoring and dossier format specification (all performed by the server computing system 110 of FIG. 1) are divided between the two server computing systems 210 and 230. In other words, the clustering application 115 and server computing system 110 of the network environment of FIG. 1 are, in the network environment of FIG. 2, replaced with clustering application 215 being run on server computing system 210, and dossier specification application 235 being run on server computing system 230. All other components of the system may be, and operate, the same as described in FIG. 1.

Clustering application 215 includes cluster/rules engine 220, clustering user interface engine 221, and scoring engine 222. Clustering application 215 generates and scores data clusters in the same manner as clustering application 115 in FIG. 1. The cluster/rules engine 220 is used in conjunction with data stored in database 140, with the data optionally being stored in data tables, as described above. Clustering user interface engine 221 may be used by the analyst in order to set the seed, the seeding strategy, the clustering strategy, and so forth. Cluster/rules engine 220 uses a seed and a defined data clustering strategy in order to generate a data cluster using data from data sources 160. Scoring engine 222 may then analyze and score the data cluster using a scoring strategy. The data cluster may then be saved in database 140 in a variety of formats, such as in one or more data tables.

Dossier specification application 235 may then be accessed. The dossier specification application 235 may include configuration user interface engine 240, enrichment engine 241, packaging engine 242, and search engine 243. Configuration user interface engine 240 may be used by an analyst to specify a dossier format, including any enrichments to be applied. Search engine 243 may operate in conjunction with enrichment engine 241 to gather relevant data from the data clusters stored in database 140. The gathered data may be enriched with enrichment engine 241. The enriched data and the dossier format may then be packaged with packaging engine 242 and sent to dossier creation application 175 in order to build a dossier for the analyst to view.

In various embodiments, client 135, clustering application 215, dossier specification application 235, and dossier creation application 175 may be run in various different combinations on one computing system. For example, the clustering application 215 and dossier specification application 235 may be performed on one computer system, similar to how FIG. 1 illustrates an embodiment having clustering application 115 that performs all the roles of clustering application 215 and dossier specification application 235.

Figure 3:
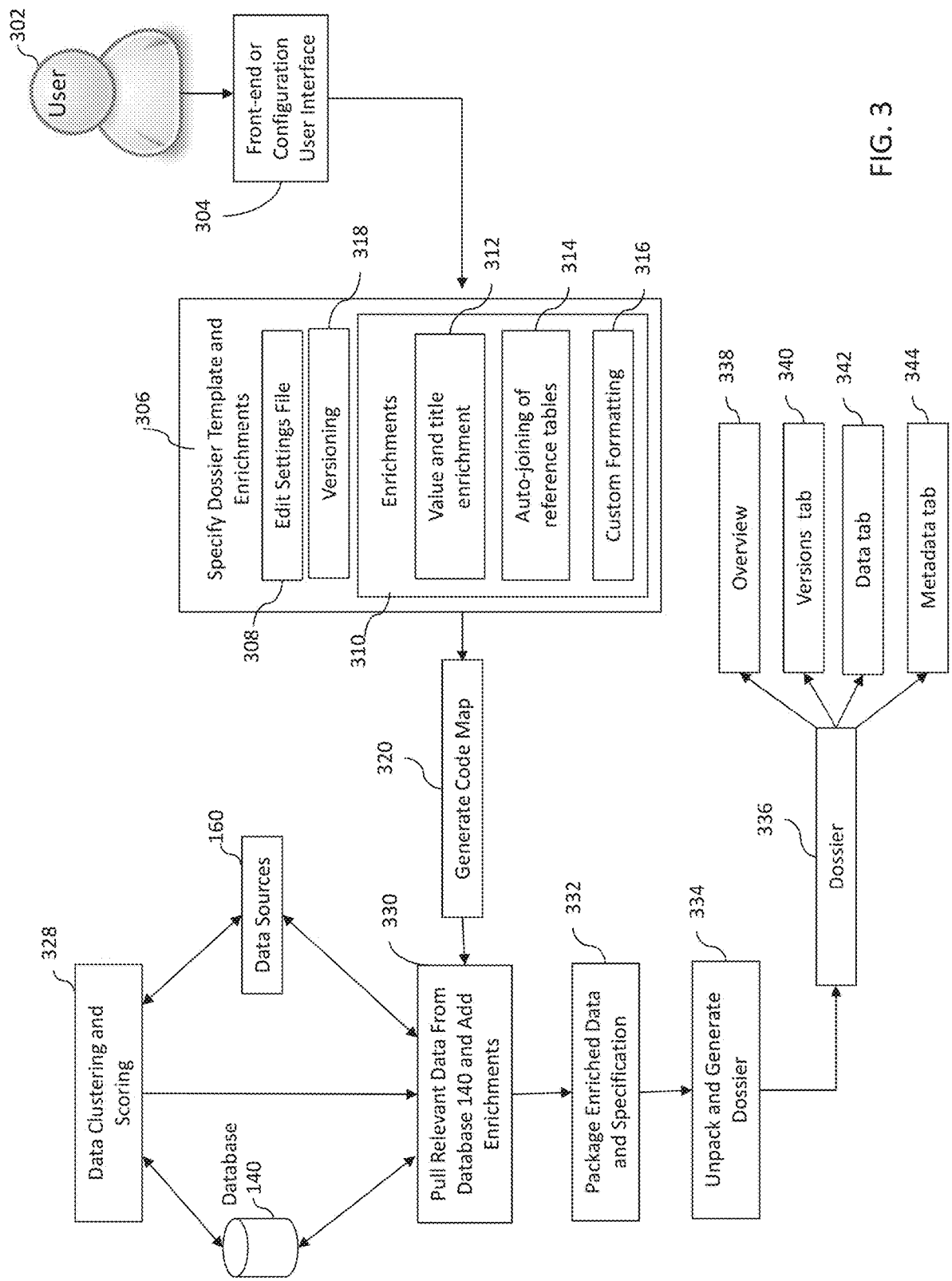
FIG. 3 is a detailed block diagram illustrating an example data analysis system, according to one embodiment of the present disclosure.

FIG. 3 is a flowchart that illustrates an embodiment of the data analysis system.

As described above, data sources 160 store data to be used by the data analysis system. Data sources 160 may have data in various formats, such as in data tables as described in the discussion of FIG. 1. Data sources 160 may be one or more data sources. In the context of trader oversight and reviewing traders for risky trading behavior, data sources 160 may have trade-related data, trader data, trading account data, counterparty data, and so forth. Data sources 160 may include a computer or drive on an internal network, a computer or drive on an external network, disks or physical medium that store data, and so forth. Data sources 160 may also include data sources residing on a cloud (e.g., remote, Internet-accessible) storage service.

At block 328, the system may perform data clustering and scoring of the data clusters based on data obtained from data sources 160. The data clusters may be generated based on cluster generation strategies such as those described above and in reference to FIGS. 1-10 of U.S. patent application Ser. No. 14/579,752, filed Dec. 22, 2014, titled "SYSTEMS AND USER INTERFACES FOR DYNAMIC AND INTERACTIVE INVESTIGATION OF BAD ACTOR BEHAVIOR BASED ON AUTOMATIC CLUSTERING OF RELATED DATA IN VARIOUS DATA STRUCTURES", and previously incorporated by reference herein. Scoring the data clusters may involve performing analysis on the data in a data cluster based on a scoring strategy, such as one of the scoring strategies described in reference to FIGS. 1-10 of U.S. patent application Ser. No. 14/579,752. The system may use the scoring and analysis to generate or compute an alert, conclusion, or flag that identifies or classifies potentially risky trading behavior associated with a data cluster. Each alert may be associated with a corresponding data cluster used to generate the alert, so that the data cluster contains data related to a generated alert on potentially risky trading behavior. The data clusters may be organized, ranked, and/or ordered based on the alert associated with each data cluster. The data clusters may be stored in one or more data tables in database 140.

As described above, database 140 may contain the data of the one or more dossiers generated by the data analysis system, stored in one or more data tables. A row in a data table may correspond to a data cluster associated with a single alert. For example, a row may be a data cluster that contains trade-related data for a single alert along with the alert itself. Each column in that alert row may define a constituent property or attribute of the alert. One column may have a trader's name, a trader type, a trader number, a trade amount, and so forth.

Database 140 may be accessed, reviewed, and/or edited using a software program. Although the dossiers in database 140 may contain information related to alerts on potentially risky behavior, it may be difficult to interpret or use this information because it is stored in table form in one or more data tables. An analyst reviewing potentially risky trading behavior may desire the dossiers to be presented in a specific dossier format that allows for improved interpretation. The analyst may be able to use a configuration user interface in order to specify a dossier format for the dossier to be presented in a dossier user interface.

Analyst 302 may be an analyst that is tasked with overseeing or investigating risky trading behavior. Analyst 302 may access a front-end or configuration user interface 304. In some embodiments, configuration user interface 304 may be an interface within a software program used to access database 140. In the figure, configuration user interface 304 is shown as a separate, stand-alone application. The configuration user interface 304 may comprise an interactive user interface that allows analyst 302 to create a dossier format in a what-you-see-is-what-you-get (WYSIWYG) manner. The interactive user interface may look like the user interfaces shown in FIGS. 7-10. Thus, analyst 302 may interactively choose data items or attributes for display, the system may automatically determine whether those data items or attributes are available in the data tables of database 140 and/or the data sources 160, the user may be able to move those data items or attributes around the dossier format, and the user may be able to add static text or structure (such as a table). In other words, the analyst may utilize the configuration user interface to decide how he wants the dossier presented in the dossier user interface to look, and where the analyst wants all the data from the data tables to be displayed, while all the data interaction and relationships between the various data tables in database 140 is hidden from analyst 302. The configuration user interface 304 may then take in the analyst inputs and translate them into a code map that the backend can understand and use to obtain the relevant data from the data tables in database 140. In other words, the configuration user interface 304 is a way of obtaining values from the analyst 302 to power the definitions used by the back-end. This may be very helpful for analyst 302, who may have personal preferences for how the dossiers should be displayed for better understanding and interpreting the dossiers. With configuration user interface 304, a non-technical analyst could do this without ever writing software code. Examples of the configuration user interface 304 are described below in reference to FIGS. 7-10.

In some embodiments, there may not be a front-end or configuration user interface 304. Rather, the analyst 302 may specify the dossier template and enrichments (block 306) using the back-end by writing the code that would make the back-end retrieve and enrich the data. In this situation, since analyst 302 is writing the code map directly, block 320 for generating the code map may not be performed by the system. Rather, the code map may be interpreted directly and used to pull the relevant data from data tables in database 140. For this back-end, the analyst 302 may fill in fields in the code and provide definitions, in order to allow data to populate any reference fields. The back-end, and even its definitions, may be generalized in order to allow obtaining of data from various data tables in database 140 in various use cases, not just use cases specific to identifying risky trading behavior. A barebones, boiler-plate code template may be provided to analyst 302 that specifies minimum required definitions needed to grab data from data tables in database 140 for sending to a dossier user interface.

As shown in FIG. 3, analyst 302 may use the configuration user interface 304 in order to specify the dossier format and enrichments at block 306. Through the analyst-defined dossier format, the dossier 336 may be presented in accordance with the dossier format. However, dossier 336 that is produced may have various sections and tables. For example, the presented dossier may be comprised of four different sections: an overview, a versions tab, data tabs, and metadata tabs. In the figure, the dossier 336 is shown as having an overview 338, versions tab 340, data tab 342, and metadata tab 344. Overview section 338 may contain quick access data that analyst 302 might be interested in upfront. This may include quick descriptions on who performed the trade, how much the trade was for, and a score or rating associated with the trade. Data tab 342 may contain in-depth detail that analyst 302 might want to access if he wants more information. Versions tab 340 may show changes that occur between versions of a data item, or show how data has changed over time along with who changed the data. Metadata tab 344 may include custom metadata in more detail, such as information on any agents, trading books, or counterparties related to the alert. The metadata tab 344 may show a direct-pass through of information associated with data in a data cluster (without enriching the data with one of the enrichments 310), and may also include trade name, cancels or corrections data, counterparty data, and so forth.

In other alternative embodiments, there may be other types of tabs and/or more or fewer tabs. For example, there may be a "Dossier List" tab that allows the analyst to view more than one dossier. There may not be a "Versions" tab such as versions tab 340 if the analyst decides that organizing data through a versioning operation is not helpful to his review of the dossiers. Thus, the analyst 302 may specify how each section and table within dossier 336 is to look. This can efficiently be done via the configuration user interface 304, as shown in FIGS. 7-10 below.

In an alternative embodiment, the analyst 302 may define the dossier format through code rather than through a configuration user interface 304. In this embodiment, the analyst may have to define a code sub-map for each separate section of the presented dossier 336. For example, the analyst 302 may have to map the section or tab name to a sub-map of labels to show for the columns or rows within each section, along with reference fields or definitions that will be populated with values from a corresponding entry in a data table of database 140 (or data sources 160).

In defining a dossier format for presenting dossier 336, the analyst 302 may define the output format of versions tab 340 by configuring the versioning 318 of data. Versions tab 340 may show differences that occur between versions of a data source. This is useful for providing context on how a data item has changed over time, and who changed that data. It is also useful for generating visualizations such as timelines in the dossier user interface, which require all the different occurrences or versions of a data item to be ordered and placed in a timeline (to show that "X" happened, then "Y" happened, then "Z" happened, and so forth).

At block 330, the system searches a population of data—such as all the data tables in database 140 and any additional data from data sources 160—for different versions of the desired data item and groups them together. Thus, if the data is, for example, spread out over forty gigabytes of data and the changes occurred over a period of two years, then versioning can be a very expensive computing operation. Technical improvements can greatly improve the efficiency and speed of the operation. One method for improving the versioning operation is through changing the algorithm or manner for connecting to, and grabbing data from, the data tables (in database 140 or data sources 160) during block 330. For example, if data from the data tables is queried through a macro or interface within a software program configured to access the data tables, then the operation may be slower than desired. Instead, it would be faster if the system was provided lower-level access to the data tables in database 140 or data sources 160. Thus, at block 330 the system may use an integrated tool to access the data tables directly, or the system may have lower-level access (that bypasses user interfaces) to the data tables, making the operation significantly faster. Examples and further discussion on how a versioning request or operation would look like is provided in more detail in FIG. 4.

However, the system needs to be configured in gathering that data at block 330, since that data may be located in various data tables within data sources 160 and/or database 140. If an analyst wants to see all versions of a trade with a specific trade ID, then the analyst may configure the operation by providing, at minimum, the desired data object to gather versions of (such as trades with a specific trade ID), the data table or (or data sources, such as data sources 160 and/or database 140) that contains all the versions of the data object, and any other information that should also be obtained from the different versions. An example of a more complex configuration may involve the analyst providing the name of the versions tab, the data table(s) to query all the versions of the trade from, the column to aggregate all the versions to, the column that contains the current version of the trade, the column containing the trader ID who changed that specific version of the trade, and any other columns of interest to monitor over the versions. Afterwards, the system at block 330 would gather up all the data containing the different versions of the trade. When this data is passed to the dossier user interface, the dossier user interface can generate a timeline or storyline corresponding to the different versions. The analyst may then obtain a better understanding of the story on how a trade changes and progresses over time. The analyst may see the patterns in amending or cancelling a trade over a timeline.

Further at block 306, enrichments 310 to the data can also be configured. These enrichments can be applied to the data that is gathered from the data table(s) (from database 140 and/or data sources 160) at block 330.

One such enrichment is value and title enrichment 312, which enriches reference fields in the dossier specified in the dossier format by populating them with the corresponding value from a data table, before any data is even sent to a dossier user interface for dossier review. Automatic referencing for reference data from a reference database can be used for many things such as trader names, book names, hierarchies, and metadata. Data enrichment is useful because desired data items that an analyst may want to display in the dossier may be split up across many data tables in various reference databases. Data enrichment can be done anytime the analyst wants to populate fields in the dossier where the data values are located in a different data table, such as in a separate reference table.

An analyst may be able to edit a settings file 308 in order to configure how the value and title enrichment 312 occurs. Value and title enrichment 312 may require the joining of reference tables which contain the data values used to populate the fields. Thus, the settings file can be used to define specific reference tables to join for each field. For example, if the analyst specifies that the dossier has a title saying "[Trader ID] did such and such", and trader ID is a field whose data values are not in the primary data table, then the system may consult the settings file. It may join the reference table containing values of trader ID, and may join all the various reference tables for all the other data fields configured for enrichment. When the enrichment is applied, the title of the dossier would no longer be "[Trader id] did such and such" but would change to something like, "Trader ID 1234 did such and such." Those data values (such as for trader ID) may also be utilized elsewhere in the dossier, such as if the specification also is configured to display "[Trader ID] is so and so." Since that trader's trader ID has already been imported, the system may also populate that field since the link to the trader ID reference table has already been established in the settings file.

The system may also automatically perform value and title enrichment 312 on cross-linked data in the reference tables. For example, a joined reference table may also contain trader names in addition to trader IDs. A trader ID field in the dossier may be populated as described above to result in a title of "Trader ID 1234 did such and such." However, a trader name field in the dossier may also be populated without having to join a new reference table. The system may automatically grab the trader name from the reference table and populate the field. Thus, an analyst may specify in the dossier format that the dossier user interface is to display a dossier that reads "[Trader Name] did such and such", and the enrichment would insert "Tom" into the "[Trader Name]" field. Furthermore as a convenience to the analyst, since the system would be aware of the structure of the reference table, the front-end would be able to autocomplete any fields being entered into the configuration user interface 304 for specifying the dossier format. Thus, by adding references to the settings file 308, it makes it easy to search for relevant data used to fill-in and populate fields within the dossier. "Extra" data items can be taken from the reference table and used without having to do a new join for those data items.

Another enrichment feature may be the auto-joining of reference tables 314. This feature allows for value and title enrichment 312 to occur for certain types of data without having to manually join reference tables for them. Instead, the automatic joining of reference tables for those data items may be configured by default. For example, a "trader" reference field may be populated by auto-joining a trader reference table, which may contain the trader IDs, corresponding names of each trader, where each trader lives, where each trader works, etc. The same could be done for "books" and "counterparties" reference fields, which may be populated from book reference tables, counterparty reference tables, and so forth.

Another enrichment feature may be custom formatting 316. The analyst 302 might specify that certain values or fields displayed in dossier 336 have a specific format. For example, analyst 302 might specify that a certain column containing the total value of a trade be displayed either as "1.2 M" or "$1,200,000). The analyst 302 may specify the output formats with an extra level of granularity, and the format is applied to the data when it is enriched.

After the dossier format and enrichments are specified, the system proceeds to block 320 and generate a code map in the back-end. This step may not be required if an analyst directly specifies the dossier format and enrichments in a code map rather than through configuration user interface 304. In various embodiments, the back-end, and its definitions, may be generalized in order to allow obtaining of data from various data tables, and in various use cases. Thus, the system is not limited to analyzing and presenting dossiers related to potentially risky behavior. The system may be able to be used anytime analysis and presentation of data/analysis is important. Some examples of potential uses are described in the various applications that were previously incorporated by reference in this disclosure. A good example is provided in U.S. patent application Ser. No. 14/579,752, filed Dec. 22, 2014, which describes many fraud-detection cases beyond fraudulent or risky trading.

At block 330, the system uses the code map in order to gather and pull all the relevant data from the data tables in database 140 (or from data sources 160). The enrichments are applied to the data, and the enriched data (the dossier) is combined into one package with the dossier format, which specifies how the enriched data should look when it is presented in the dossier user interface. Calculations, computations, or scoring, such as those performed by scoring engine 328, were already performed at block 328 and the results stored in the data tables in database 140. The system at block 330 can gather those scores in order to pass their static values through to the dossier generation application for presenting in the dossier user interface. At block 330, the data may be reformatted when it is grabbed from the data tables. In some embodiments, the system at block 330 takes the relevant data from the data tables and puts it in JSON format. The packaged data is then sent by the system to a dossier user interface at block 334.

Figure 12:
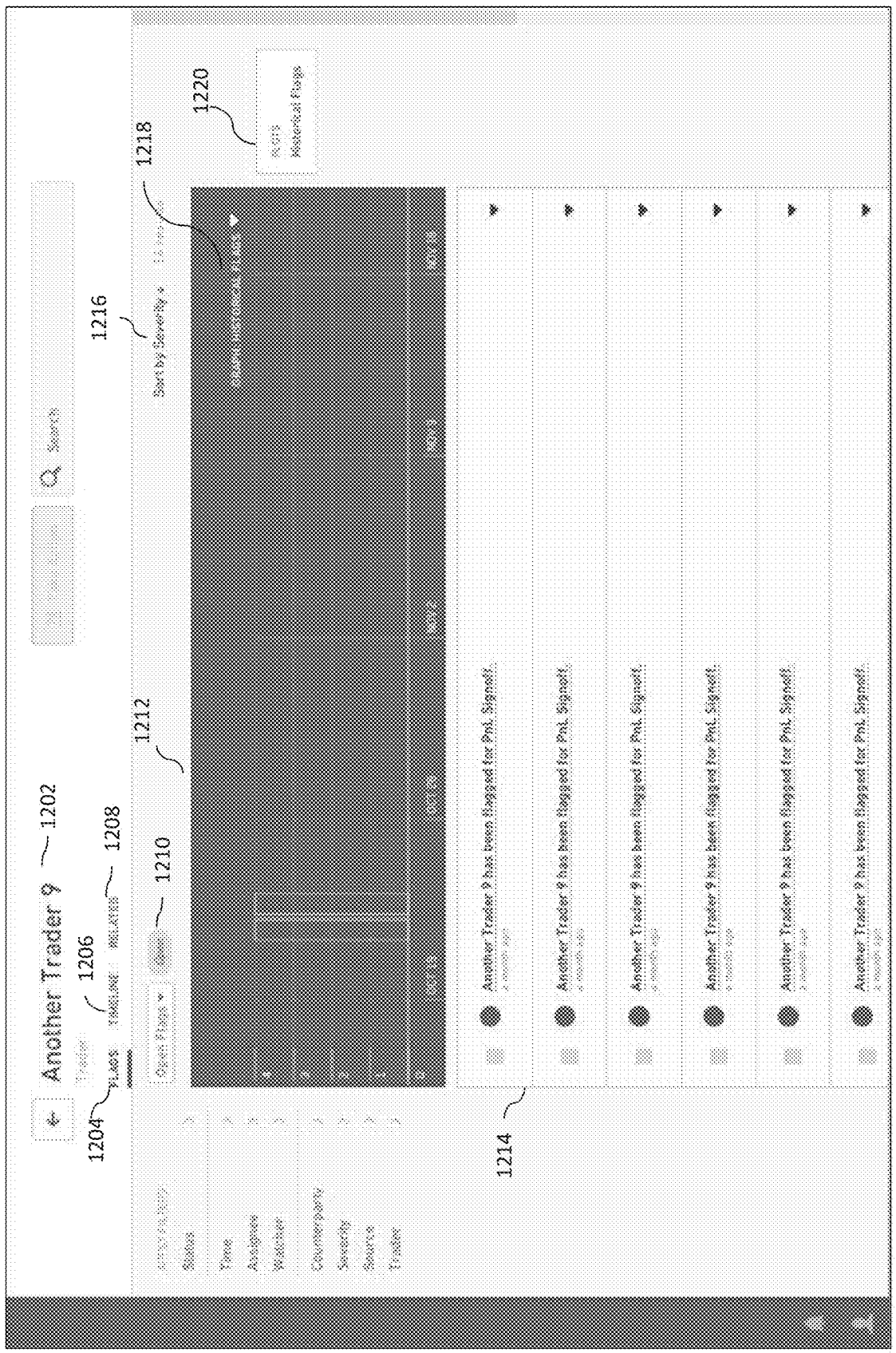
FIG. 12 is an example of a dossier user interface for displaying dossiers, according to one embodiment.

At block 334, the packaged enriched data and dossier format are read and unpackaged in order to generate dossier 336 for viewing through a dossier user interface, such as the dossier user interface shown in FIG. 12, or such as the user interfaces shown in U.S. patent application Ser. No. 14/579, 752, filed in Dec. 22, 2014, and previously incorporated by reference. The system at block 334 takes the enriched data and presents it in the specified dossier format, so that an analyst can review dossier 336 and its components: overview 338, versions tab 340, data tab 342, and metadata tab 344.

Versioning

Figures 4A, 4B:
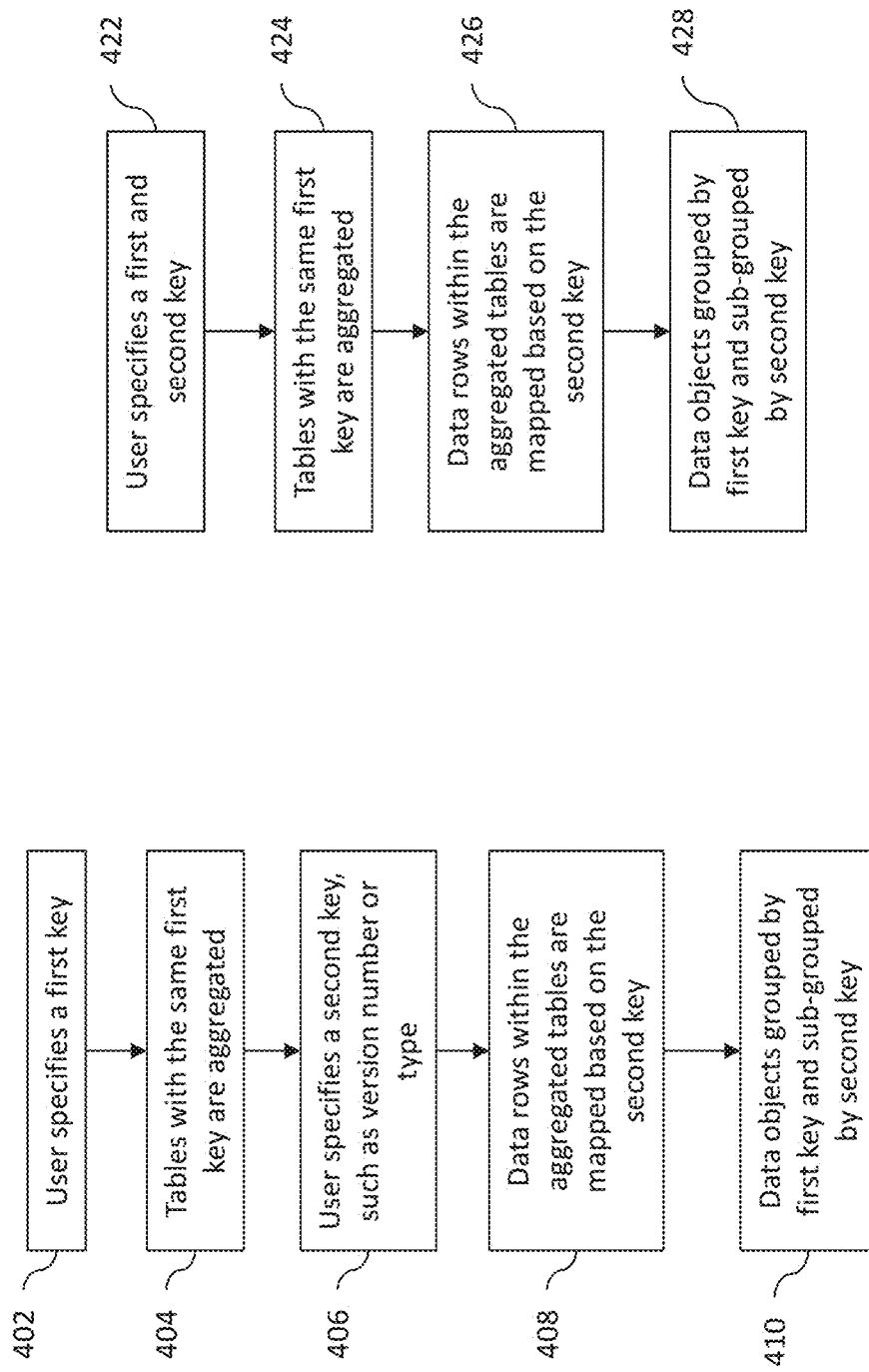
FIG. 4A is a flowchart that illustrates how a user could perform a versioning operation according to one embodiment.
FIG. 4B is a flowchart that illustrates how a user could perform a versioning operation according to another embodiment.

FIG. 4A is a flowchart that illustrates how a versioning operation may be performed according to one embodiment.

The versioning operation may require specifying two key values. In one embodiment, if the versioning is performed on a collection of data items, all data items sharing the first key value are aggregated (for example, all trades with one trade ID). Then an ordering or mapping is conducted on the data items based on their second key (for example, placing those trades in chronological order). However, as shown in FIG. 4A, some embodiments involve versioning being performed on data in data tables, in order to map data rows within the data tables. FIG. 4A demonstrates how the analyst can specify the two key values separately.

At block 402, the analyst specifies a first key to use. For example, the first key could be a trade ID. That first key is used by the system at block 404, where data tables with the same first key in common are aggregated or gathered. The data tables may be part of one or more databases and/or data sources. Afterwards, at block 406 the analyst may then be prompted to provide a second key, such as a version number or data type. Data rows within the aggregated tables may then be mapped or ordered based on the second key at block 408. The result is at block 410, the data is grouped by a first key (corresponding to the data tables) and sub-grouped by a second key (for example, a column within the data rows of the data tables).

FIG. 4B is a flowchart that illustrates how the system may perform a versioning operation according to another embodiment. FIG. 4B is similar to FIG. 4A, except that in FIG. 4B the analyst specifies the first and second key at the same time.

At block 422, the analyst specifies both a first and second key. The system at block 424 uses the first key to aggregate data tables corresponding to, or associated with, the first key. Then the system at block 426 maps data rows within the aggregated data tables based on the second key. At block 428, the result is the same as FIG. 4A, with data objects being grouped by a first key and sub-grouped by a second key.

The embodiments in FIGS. 4A and 4B each have their advantages. For example, FIG. 4B may be quicker if the versioning operation is to be performed once. The analyst provides both keys up front, and no time is wasted having to obtain the second key. However, the embodiment of FIG. 4A may be desired if versioning is to be conducted multiple times using the same first key. Since the data tables have already been aggregated once with the first key, subsequent versioning operations that use the same first key may skip block 404.

Figure 5:
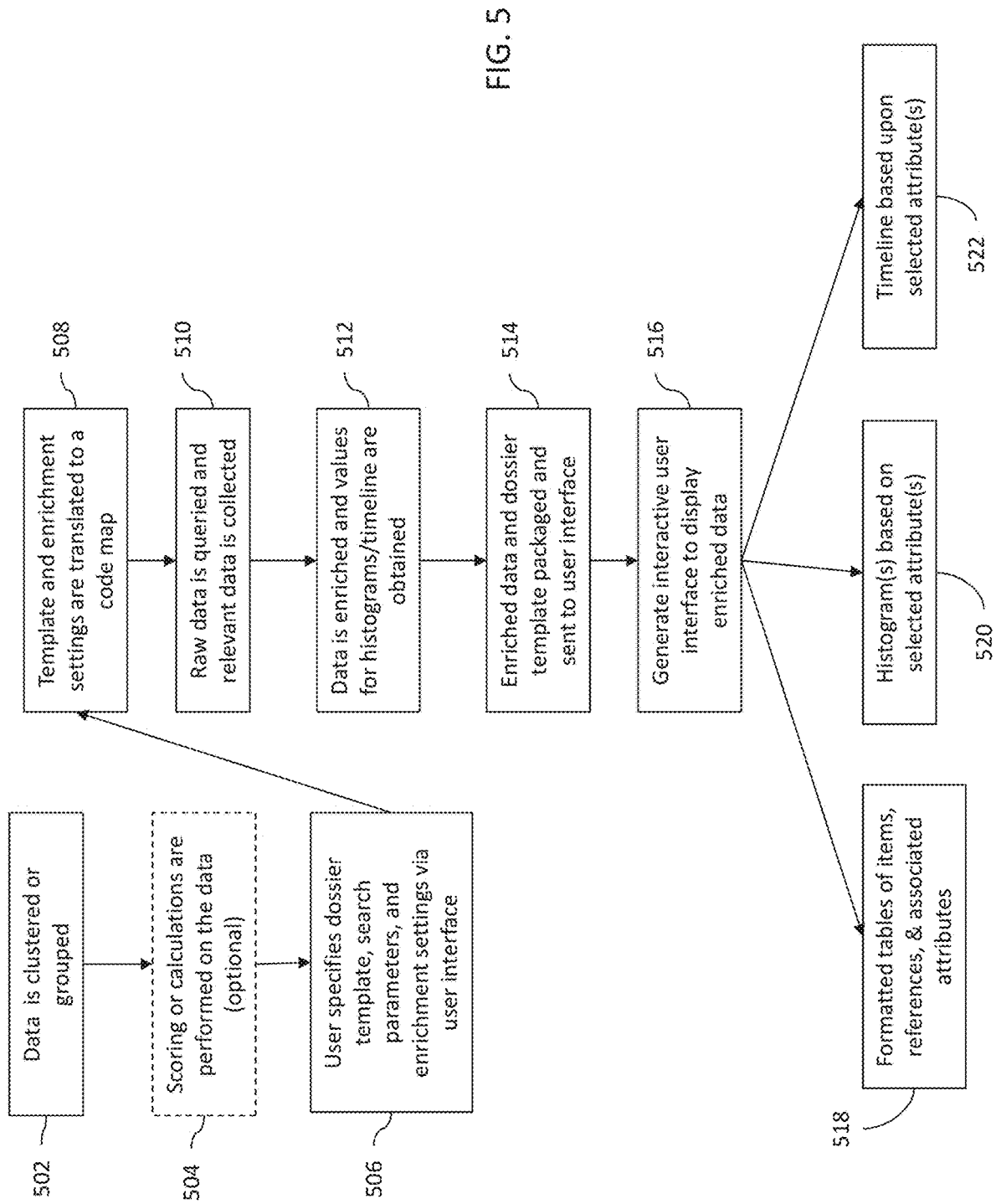
FIG. 5 is a flowchart that illustrates the role versioning may play in generating visualizations in the interactive user interface, according to one embodiment.

FIG. 5 is a flowchart that illustrates the role versioning plays in generating the dossier user interface, according to one embodiment.

At block 502, data is clustered or grouped according to a data clustering strategy. The data cluster may be stored in a single data table or multiple data tables. For example, trades for a specific trader may all be grouped into a data cluster.

At optional block 504, scoring or calculations are performed on the data cluster. This scoring may be done based on a scoring strategy to generate an overall risk score associated with the data cluster, or an alert, flag, or conclusion. The alert and its related data may be stored within a data row in a data table.

At block 506, the analyst specifies a dossier format and enrichment settings via a configuration user interface. The analyst may also specify search parameters, such as definitions for the joining of reference tables, or the keys used in a versioning operation.

At block 508, the template and enrichment settings are translated into a code map. Using that code map, the system at block 510 queries the data tables for any relevant, raw data in the data cluster. The collected relevant data may be a subset of the data within the data cluster. A versioning operation may be fully performed at this stage in order to obtain mapped data for display in visualization.

At block 512, the data is enriched. Alternatively, the versioning operation could be fully performed at this stage to have mapped data for display in visualization. The operation may be fully conducted at block 512. Alternatively, the versioning operation may begin at block 510 by aggregating relevant data based on the first key. Then, at block 512 the versioning operation may conclude by sub-grouping or mapping data items within the aggregated data using the second key.

At block 514, the enriched data and dossier format are packaged together and sent to the dossier user interface. At block 516, the packaged data is unpacked and a dossier user interface is generated to display the enriched data based on the dossier format. At block 518, the system may display formatted tables of items, references, and associated attributes with the dossier. However, at this stage the dossier user interface is simply displaying the static value of the enriched data and not compiling the table components (or populating any reference fields). At block 520, the system may display histogram(s) based on selected attributes. These histogram(s) may have been generated by determining the distributions or relationships of data. For example, the system at block 512 may have determined the frequency of risky trading based on the years of experience a trader has. Just as an example, occurrences of alerts may have been separated into various buckets for the different ranges of years of experience associated with the trader triggering each alert. That data can be passed to the dossier user interface, which draws the histogram. At block 522, the dossier may also be displayed to a timeline based on selected attribute(s). The operation or algorithm for generating this timeline may have already been completed by the end of block 512. The versioning operation may have grouped data items and mapped them out chronologically. That mapped order of data items may be passed to the dossier user interface, which just generates a timeline for displaying those changes in the data over time.

In simpler terms, the versioning operation may allow for a "Versions" tab or section of the dossier to be displayed. That section of the dossier may be generated by organizing or ordering data to be displayed in a separate data table. For example, the versioning operation may gather related instances of a data item that is stored across multiple data tables in a database. The versioning operation may then put all that data into a singular, separate data table with the instances ordered within that data table. In a more specific example, the versioning operation may find and gather all trades performed by Trader A, and that data may be stored in multiple data tables. Those trades may be put into a separate data table and organized chronologically within that data table. In a non-cached version of the versioning operation, the separate data table may be a private data table that is recomputed and/or re-organized every time data is aggregated to the data table. In a cached version of the versioning operation, which may be preferable for larger sets of data, the collected data may be cached so that the larger, separate data table may only need to be computed or organized once.

The versioning operation may aggregate data from various data tables by a first key, which may be associated with a kind of data item or attribute of a data item that the analyst is interested in looking at. The versioning operation may then place the contents of any data rows associated with the first key in the various data tables into a map, based on a second key which is associated with how the aggregated data should be organized or ordered. For example, the second key may be associated with a version number or version type attribute of the aggregated data, so that the aggregated data may be sorted by increasing version number.

A code map, which may be user-defined or generated by translating user inputs in a configuration user interface, may be used to configure a versioning operation. The code specifying a versioning operation may be a custom verb, such as "aggregateAsMap." As an example, if the data looked like:

| ID | VERSION | DATA |
|----|---------|------|
| foo | 1 | bar |
| baz | 1 | bazoo |
| foo | 2 | foofoo |
| foo | 3 | foobarbaz |

An analyst who desires to aggregate this data based on ID as the first key, and then group the results based on VERSION as the second key, may use code (or enter user inputs in the configuration user interface that would be functionally equivalent) such as:

aggregateAsMap key: ['ID'], mapKey: 'VERSION', output: 'VERSIONS_DATA'

The data may be collected and organized into a separate data table, such as:

| ID | VERSIONS_DATA |
|----|---------------|
| foo | {1:{'DATA': 'bar'}, 2: {'DATA': 'foofoo'}, 3: {'DATA': 'foobarbaz'}} |
| baz | {1: {'DATA': 'bazoo'}} |

In this example, the system may then be able to present, to the analyst, through the dossier user interface, the various DATA items for a given ID ordered by VERSION. Here, the ordered DATA items may be stored as VERSIONS_DATA to be passed to the dossier user interface as static text. The dossier user interface may not need to do any further re-organizing or re-ordering, and may be able to just display the contents of a VERSIONS_DATA item in a section of the dossier.

Joining Reference Tables

Figure 6:
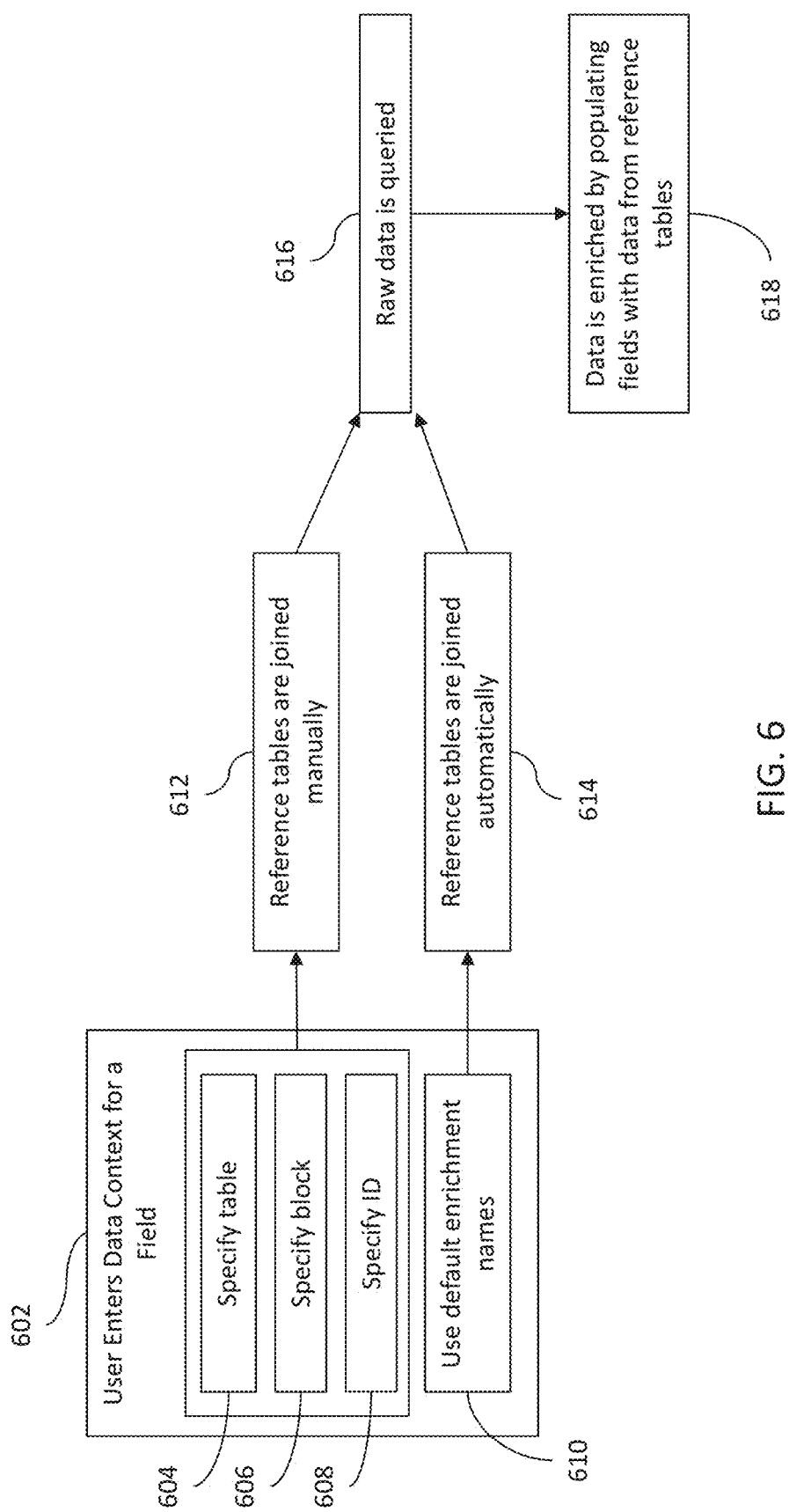
FIG. 6 is a flowchart that illustrates manual and automatic joining of reference tables, according to one embodiment.

FIG. 6 is a flowchart that illustrates manual and automatic joining of reference tables, according to one embodiment.

At block 602, the analyst may be utilizing either a configuration user interface or just the back-end in order to specify the dossier format. The analyst may want to enter one or more reference fields for the dossier format, and at block 602 the analyst provides a data context for each reference field so that the system knows where to grab the data used to populate each reference field.

At block 610, the system may allow the analyst to resort to using default enrichment/reference field names provided by the system. For example, in the context of trader oversight and detecting potentially risky trading behavior, the system may have default field names for trader name or counterparty name. If the default field name for trader name is "[Trader Name]", the analyst can specify a dossier title to read, "[Trader Name] did such and such." If the default field name for trader name is already configured to automatically join certain reference tables that contain the trader's name when the field name is recognized, then the analyst would not have to manually join reference tables in order to populate the trader name field. However, an analyst may not always be able to use default enrichment names at block 610. The data analysis system is designed to allow an analyst to specify the data table, block, and/or ID for populating a field so that the system can be generalized and applied to various use cases, including use cases where there may not be any existing, previously-defined default field name.

The system may also allow an analyst to manually enter the location of the data value for populating to the reference field. This feature of allowing the manual entering of data locations may be in addition to, or in lieu of, the feature of accepting default reference fields. For example, the analyst may specify the exact data table(s) containing the data needed for populating the reference field. The analyst may also provide both the row and the column where the data value is located within the table. Thus, to manually enter a data context and join a reference table, an analyst may specify the reference table at block 604, specify a block or portion of the reference table at block 606, and/or specify an ID associated with the data value or reference table at block 608. Enabling the analyst to manually join the reference tables at block 612 may allow the system to be generalized to use cases outside of those use cases defined by the default reference fields. For example, the system may have default reference fields that are specifically defined in the context of identifying risky trading behavior. However, an analyst may wish to use the system on different data to identify tax fraud. Those default reference fields, defined for identifying risky trading behavior, may be unable to be applied on data containing tax-related information. The analyst may be able to manually join reference tables and define the relationships between the various data tables containing the tax-related data, so that the analyst can ultimately view dossiers containing tax-related information in the dossier user interface.

In either case, once a reference table is joined either manually or automatically, value and title enrichments can be performed by first querying the relevant raw data within the reference tables at block 616. For example, if an analyst joined a reference table containing trader names to populate a trader name field, then the system at block 616 would obtain all the trader names from the reference table that are associated with a data cluster being analyzed. Afterwards, at block 618, the value and title enrichments are applied by populating data fields with the relevant data queried from the joined reference table.

Figure 7:
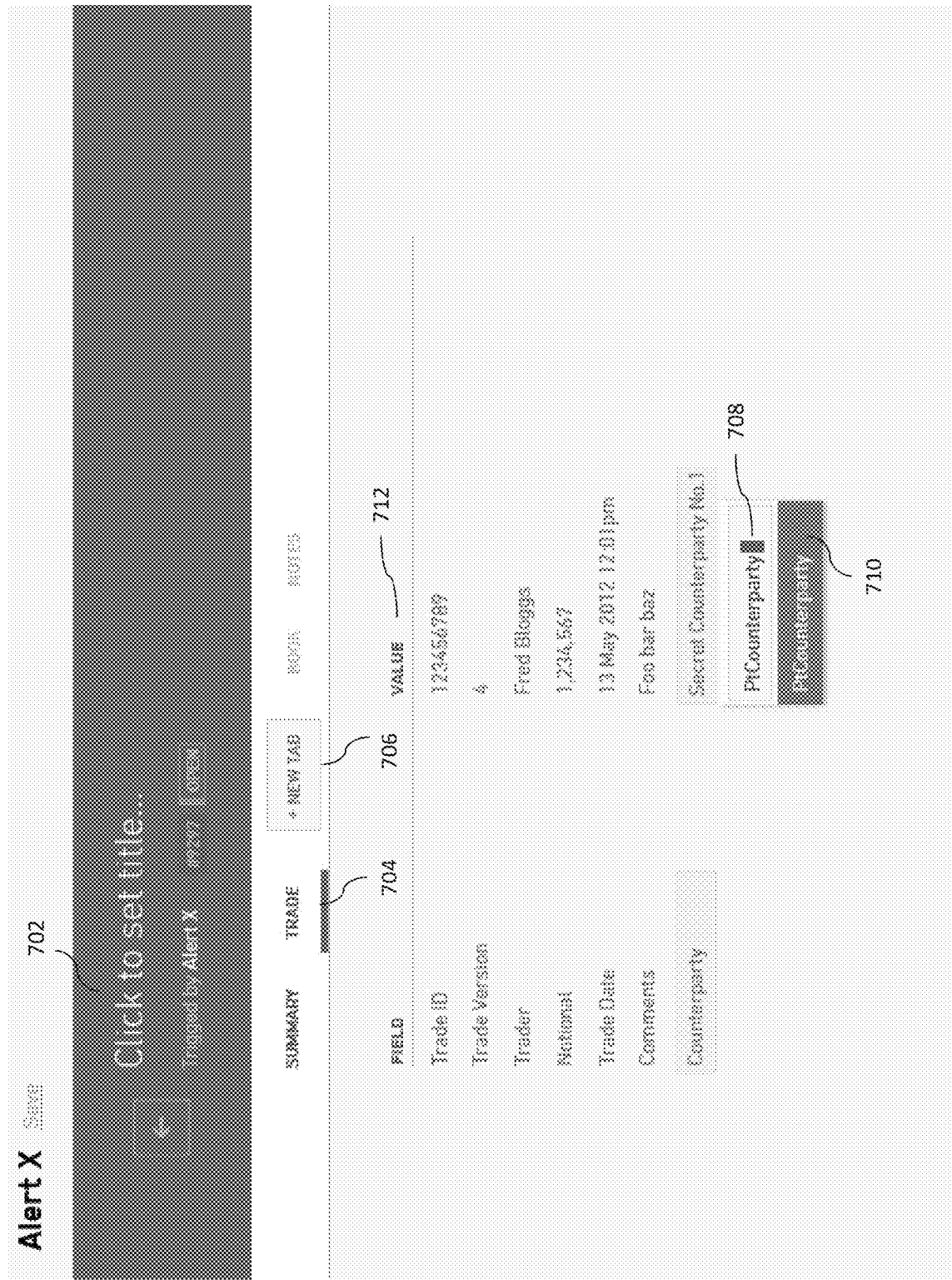
FIG. 7 is an example of a configuration user interface for specifying a template for a table in a dossier, according to one embodiment.

Further examples of how datasets may be stored, modified, or manipulated in data tables are provided in U.S. patent application Ser. No. 14/874,690, filed Oct. 5, 2015, and titled "DOMAIN-SPECIFIC LANGUAGE FOR DATASET TRANSFORMATIONS," the entire disclosure of which is hereby made part of this specification as if set forth fully herein and incorporated by reference for all purposes, for all that it contains.

Configuration User Interfaces FIG. 7 is an example configuration user interface for specifying a template for a table in a dossier, according to one embodiment of the disclosure.

In this figure, the configuration user interface shows the trade tab 704 of an alert that may be displayed based on a dossier format. The new tab button 706 can be clicked to generate a new tab within the dossier format. At the top of the interface is the dossier title 702, which currently reads "Click to set title . . . " as a default since it has not yet been set by the analyst. At the top of the dossier format is a title that can be set. Within the table of the template, fields or values may be modified by clicking on the corresponding cell within the table. Through this interface, an analyst can choose the info they want to display on the dossier's trades tab, input fields and link the fields to the reference field names for corresponding data table(s). Here, the values column 712 for this trade tab of the dossier shows values for trade ID, trade version, trader, notional, trade date, comments, and counterparty. Some of these values in the values column 712 may be generated by a reference field that informs the system to populate the field by obtaining a data value from a reference table. For example, clicking cell 708 may allow the analyst to set a value or reference field in cell 708. In the figure, the analyst has typed in "PtCounterparty", which may be the name of a defined reference field. It may be a default reference field that allows for automatic joining of a reference table. Or it may be a reference field that was setup in the settings file, so that the reference table is manually joined. The configuration user interface recognizes the reference field, which is why auto-complete dropdown 710 shows "PtCounterparty" as a known and selectable reference field.

Figure 8:
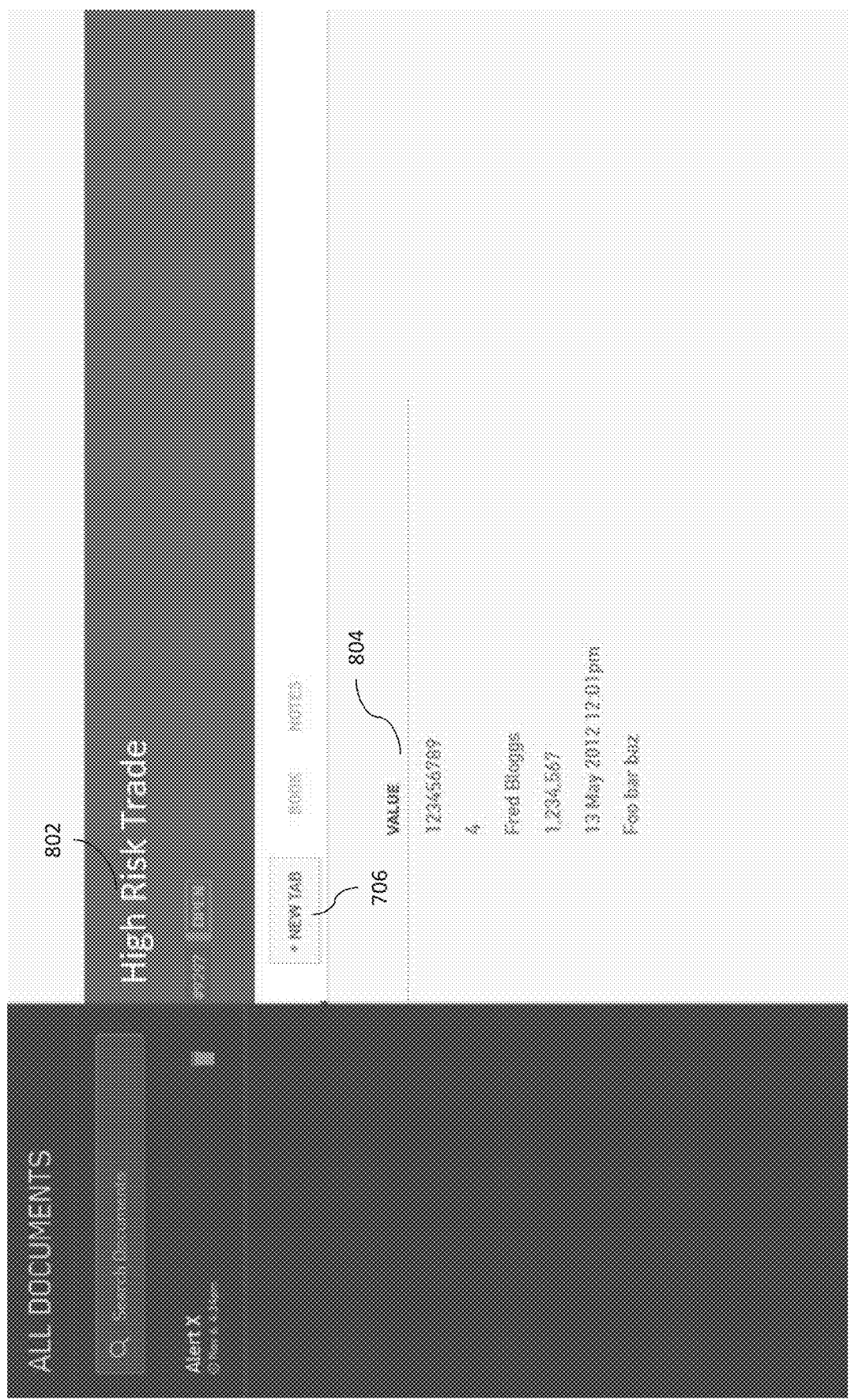
FIG. 8 is an example of one view in a user interface for previewing a dossier template, according to one embodiment.

FIG. 8 illustrates how a dossier format can be previewed in the configuration user interface, according to one embodiment of the disclosure.

The title of the dossier 802 has now been changed to "High Risk Trade". The new tab 706 button is there for creating a new tab within the dossier format. Value column 804 shows all the data values for the desired fields that were set up in the dossier format.

Figure 9:
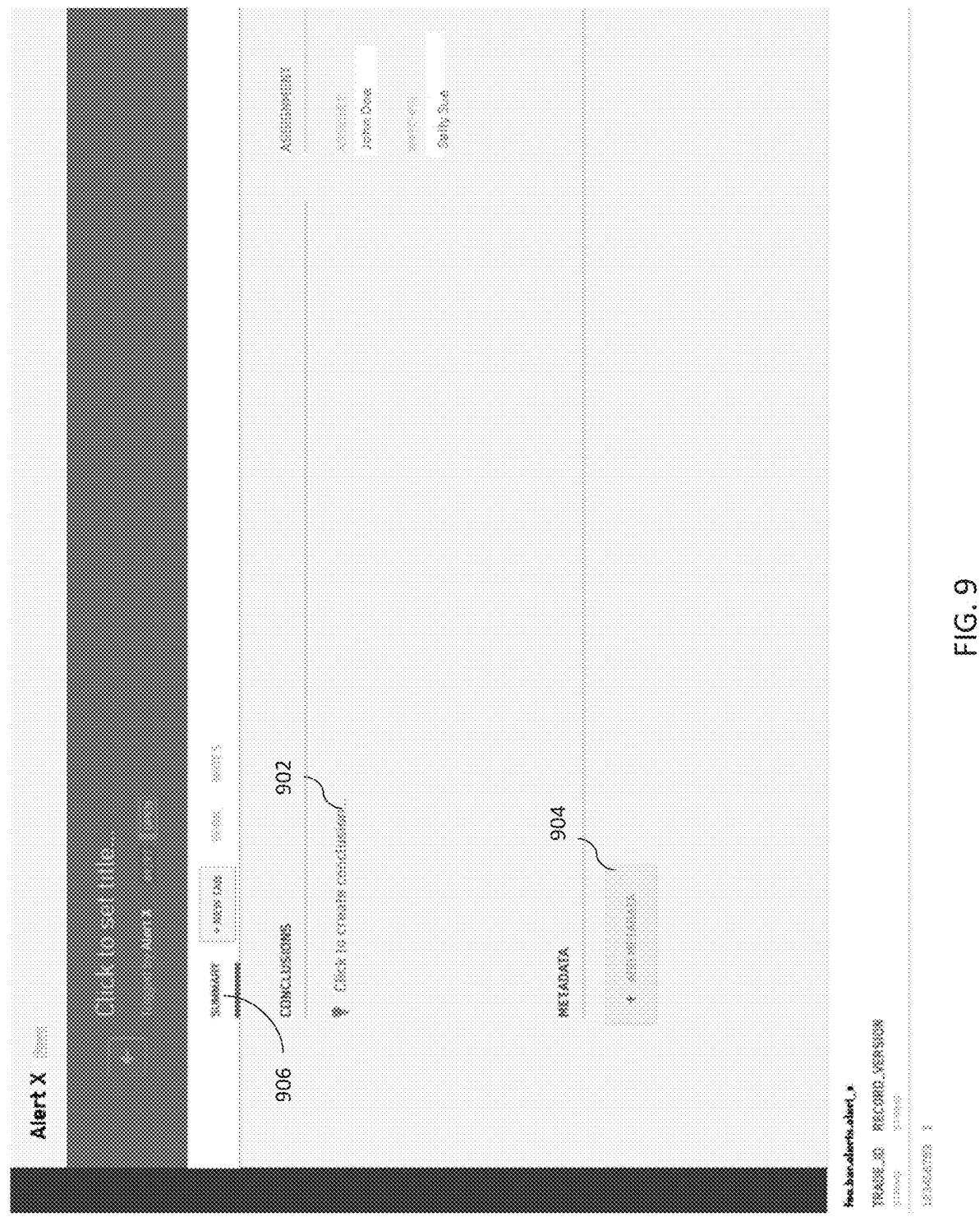
FIG. 9 is an example of one view in a user interface, according to one embodiment.

FIG. 9 illustrates how a dossier format can be further modified, according to one embodiment of the disclosure.

In this figure, summary tab 906 has been selected instead, which allows the analyst to modify how an overview of the dossier would appear in a dossier user interface. This tab also allows the analyst to specify how a conclusion would look like. There is a text field or text box 902 that an analyst may click on in order to enter the conclusion. The analyst may be able to enter a combination of text and reference fields into this conclusion text box 902. The system may be able to perform field interpolation and insert the actual data value or string into the reference field, rather than displaying the name of the reference field itself, when this dossier conclusion is displayed in the dossier user interface. This display also has a add metadata 904 button. By clicking on this button, an analyst may be able to add metadata that would appear on the dossier. This feature is further described in FIG. 10.

Figure 10:
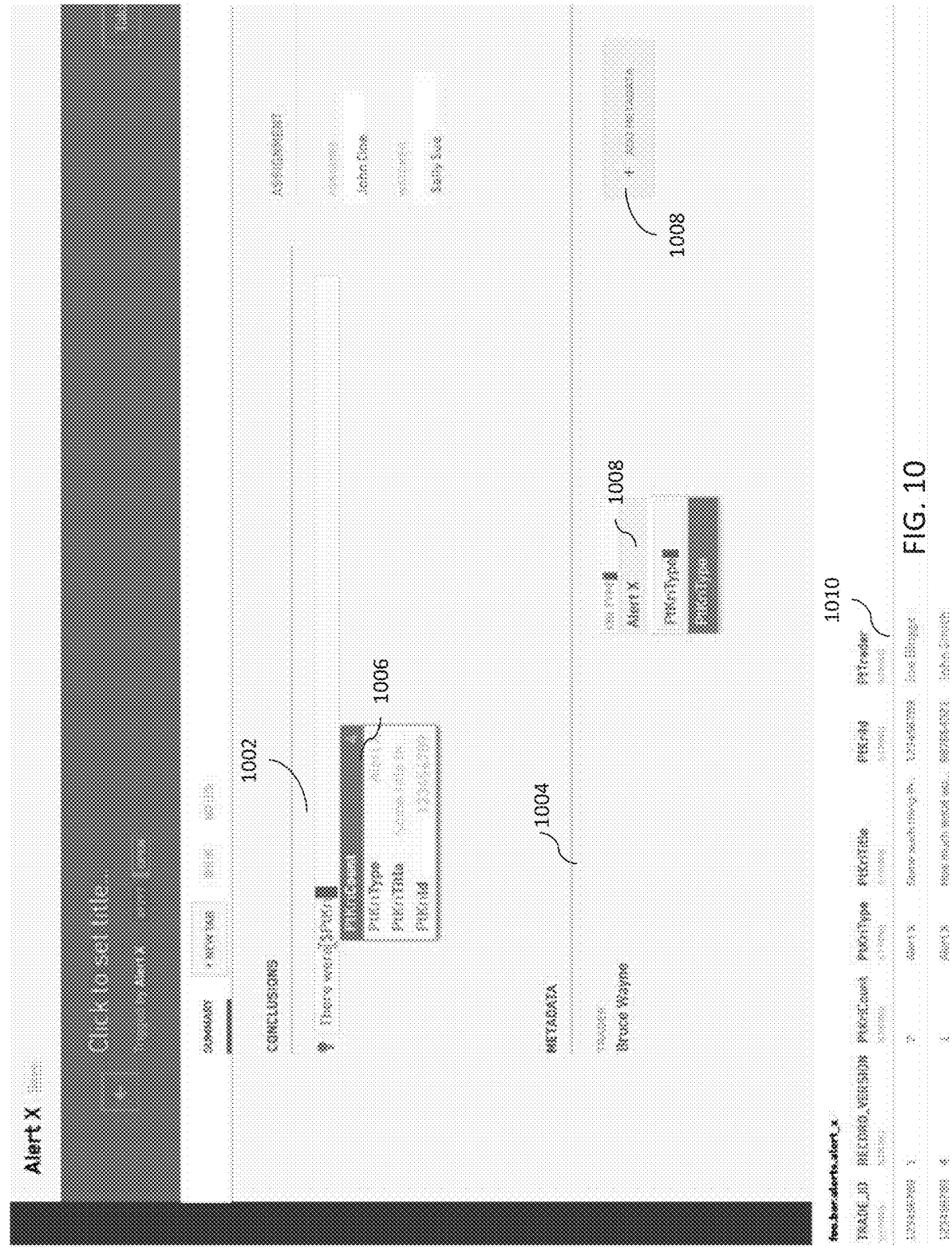
FIG. 10 is an example of one view in a user interface that allows a dossier template to be further modified with reference fields, according to one embodiment.

FIG. 10 illustrates how a dossier format can be modified to include reference fields, according to one embodiment of the disclosure.

The display in FIG. 10 appears similar to that of FIG. 9, except some of the components of the dossier format have been filled in. The text box 1002 shows the analyst entering a combination of text and a reference field. The text, "There were $", is static text that would show up in every dossier conclusion. It is followed by "PtKri" which is the beginning of various reference fields that the system recognizes, and thus the system provides an auto-complete drop-down 1006 that allows the analyst to quickly complete the reference field. The presence of a specific reference field in this auto-complete drop-down 1006 may signal that the system is already aware of the reference table, and the structure of the reference table, that corresponds to that reference field. This display also has metadata that has been entered into the dossier format. Metadata section 1004 shows the metadata specified to be displayed in the dossier. There is a trader field that has been populated with "Joe Bloggs". This may be the result of the analyst entering in a reference field, such as "PtTrader", associated with the trader's name that the system recognizes and populates with the trader's name. Although an analyst could enter "Joe Bloggs" as a static text value under this trader field, that may be undesirable unless every dossier or alert set to be displayed in the dossier user interface was certain to involve "Joe Bloggs" as the trader. The display also shows metadata field 1008, which the analyst has currently configured to display metadata regarding the alert type of any generated dossier, here set to be the string "Alert X" for reference field "PtKriType"

If the analyst wishes, he can click the add metadata button 1012 to add more metadata for display in the dossier user interface. At the bottom of the display is list 1010, which displays a short list of some trades in the data cluster along with some of their associated metadata. In some embodiments, the analyst may be able to click on one of the trades in the list to be presented with more information about that specific trade. In some embodiments, clicking a specific trade in the list may fill in the dossier format with information about that trade.

Implementation Mechanisms

According to an embodiment, the data analysis system and other methods and techniques described herein are implemented by one or more special-purpose computing devices. For example, the server computing system 110, server computing system 170, and/or client computer system 130, as illustrated in FIG. 1, may be implemented as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 11:
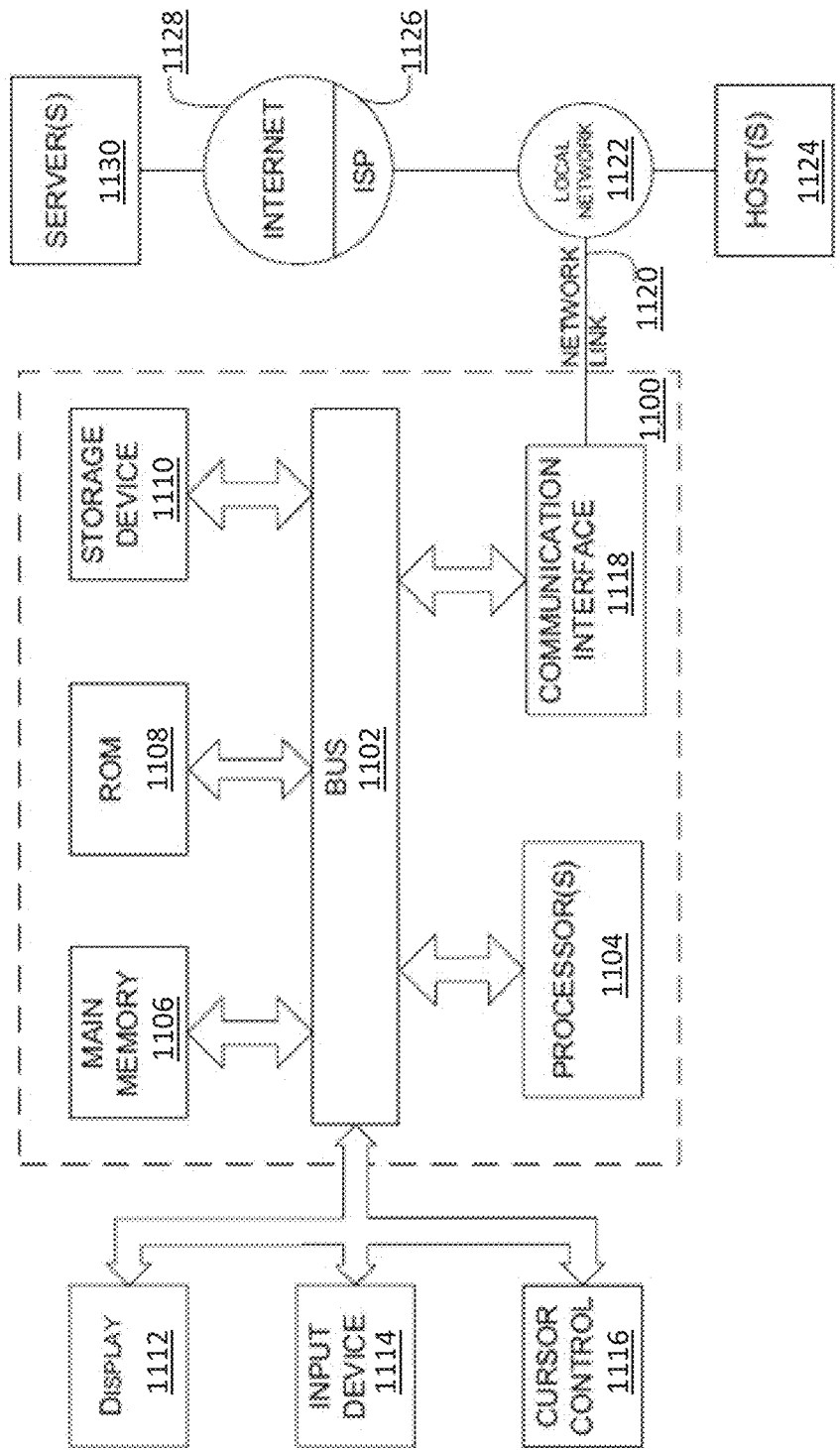
FIG. 11 illustrates a computer system with which certain methods discussed herein may be implemented.

For example, FIG. 11 is a block diagram that illustrates a computer system 1100 upon which the various systems and methods discussed herein may be implemented. For example, in various embodiments, any of the computing systems illustrated in FIG. 1, such as client computer system 130, server computing system 170, and/or server computing system 110, may be implemented as computer systems 1100 and/or servers 1130 as illustrated in FIG. 11.

Computer system 1100 includes a bus 1102 or other communication mechanism for communicating information, and a hardware processor, or multiple processors, 1104 coupled with bus 1102 for processing information. Hardware processor(s) 1104 may be, for example, one or more general purpose microprocessors.

Computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), and/or any other suitable data store, is provided and coupled to bus 1102 for storing information (for example, file data items, analysis information data items, submission data items, and/or the like) and instructions.

Computer system 1100 may be coupled via bus 1102 to a display 1112, such as a cathode ray tube (CRT), LCD display, or touch screen display, for displaying information to a computer user and/or receiving input from the analyst. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1100 may include a user interface module (e.g., a user interface engine 121 as illustrated in FIG. 1), and/or various other types of modules to implement one or more graphical user interface of the data analysis system, as described above. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware devices (such as processors and CPUs) may be comprised of connected logic units, such as gates and flip-flops, and/or may be comprised of programmable units, such as programmable gate arrays or processors. Generally, the modules described herein refer to logical modules that may be combined with other modules or divided into sub-modules despite their physical organization or storage. In various embodiments, aspects of the methods and systems described herein may be implemented by one or more hardware devices, for example, as logic circuits. In various embodiments, some aspects of the methods and systems described herein may be implemented as software instructions, while other may be implemented in hardware, in any combination.

As mentioned, computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more modules and/or instructions contained in main memory 1106. Such instructions may be read into main memory 806 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions and/or modules into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media. In some embodiments, network 150 (as illustrated in FIG. 1) may correspond to a local network 1122 and/or Internet 1128.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. For example, in an embodiment various aspects of the data analysis system may be implemented on one or more of the servers 1130 and may be transmitted to and from the computer system 1100. For example, submitted malware data items may be transmitted to one of the servers 1130, aspects of the basic analysis may be implemented on one or more of the servers 1130, and/or aspects of the external analysis may be implemented on one or more of the servers 1130. In an example, requests for external analyses of file data items may be transmitted to one or more third-party servers 1130 (from, for example, the computer system 1100 and/or another server 1130 of the system), and analysis data may then be transmitted back from third-party servers 1130.

In an embodiment, the data analysis system may be accessible by the analyst through a web-based viewer, such as a web browser. In this embodiment, the user interfaces of the system may be generated by a server (such as one of the servers 1130) and/or the computer system 1100 and transmitted to the web browser of the analyst. The analyst may then interact with the user interfaces through the web-browser. In an embodiment, the computer system 1100 may comprise a mobile electronic device, such as a cell phone, smartphone, and/or tablet. The system may be accessible by the analyst through such a mobile electronic device, among other types of electronic devices.

Dossier User Interface

FIG. 12 is an example dossier user interface for displaying dossiers based on a dossier format, according to one embodiment of the disclosure. The illustrated view may be displayed when a particular dossier is selected by the analyst.

In this example, title 1202 shows that the information provided relates to the "Another Trader 9" dossier. In an embodiment, any filters or enrichments in the dossier may be shown in dossier user interface by selecting filters 1210. The filters may be applied to any one or more of charts, alerts, and/or other data shown in the dossier user interface of FIG. 12. In some embodiments different filters may be applied to the different aspects of the dossier user interface of FIG. 12. Additionally, the user may apply and/or remove any filters, and/or apply states, in the dossier user interface of FIG. 12.

The example user interface of FIG. 12 includes various tabs 1204, 1206, and 1208 for viewing information related to the dossier. Currently the "flags" tab 1204 is selected, which displays information associated with the various clusters/alerts of the dossier. For example, a list of alerts 1214 is shown in the dossier user interface, which is associated with the dossier being viewed. The alerts may be sorted in various ways by selection of a sorting element 1216. In an embodiment, the analyst may select one or more of the alerts to apply a state and/or view details of the alert. Additionally, a time-based chart 1212 is shown, which may be generated based on data aggregated and sorted through a versioning operation. In the dossier user interface of FIG. 12, the analyst may select any data to view in the chart 1212 via, for example, the dropdown 1218 and the list of previous charts 1220. In various embodiments, any type of data may be plotted in the chart 1212. For example, in one embodiment a risk score associated with the trader may be plotted over time. The risk score may be determined based on all or some of the data in the dossier. The risk score may be determined based on other data in the database or accessed from one or more data sources. The risk score may be determined based on a risk model. The system may be customized to display any charts of any type, and including any data, that are useful for the analyst in analyzing the dossier.

Tabs 1206 and 1208 may be selected by the analyst to view other information related to the dossier in the dossier user interface. For example, "timeline" may display a more detailed chart, and/or may display a chart with data drawn from the database, one or more data sources, or data outside of the clusters of the dossier. "Related" may display other dossiers and/or clusters/alerts associated with the current dossier, and may provide a direct link to those dossiers/clusters. For example, if two traders are associated with a cluster (for example, by a tag and/or data item associated with the cluster), and the user is viewing the dossier of one of the traders, the other trader (along with a like to that trader's dossier) may be displayed in the related tab.

In other embodiments, the user interface of FIG. 12 may include more or fewer tabs, each of which may be customized and specific to the type of investigation being performed by the analyst and/or the cluster types associated with the dossier.

ADDITIONAL EMBODIMENTS

Embodiments of the present disclosure have been described that relate to automatic generation of memory-efficient clustered data structures and, more specifically, to automatic selection of an initial data item of interest, adding of the initial data item to the memory-efficient clustered data structure, determining and adding one or more related data items to the cluster, analyzing the cluster based on one or more rules or criteria, grouping these clustered data structures, allowing an analyst to specify a dossier template for presenting grouped data clusters in an user interface, allowing an analyst to specify enrichments to be applied to the raw data in the data clusters, gathering and retrieving relevant data in the data clusters, applying enrichments to the retrieved raw data from the data clusters to obtain enriched data, and providing an interactive user interface to an analyst that displays the enriched data in accordance with the dossier template. As described above, in various embodiments, a generated cluster or group of clusters may include far fewer data items as compared to a huge collection of data items that may or may not be related to one another. This may be because, for example, data items included in a cluster may only include those data items that are related to one another and which may be relevant to a particular investigation. Further, data items in a cluster may comprise simple references to a master instance of the data item, further saving memory requirements. Accordingly, in various embodiments, processing of generated clusters may be highly efficient because, for example, a given risky trading investigation by an analyst may only require storage in memory of a single group of cluster data structures. Further, a number of data items in a cluster may be several orders of magnitude smaller than in the huge collection of data items that may or may not be related to one another because only data items related to each other are included in the clusters.

Additionally, the user-defined dossier template and enrichments, when paired with the automated analysis, grouping, and scoring of groups of clusters (as mentioned above), may enable highly efficient evaluation of the various data clusters by a human analyst. For example, the interactive user interface may be generated so as to enable an analyst to quickly view critical groups of data clusters, and based on the analyst's desired template and enrichments, display enriched data or information (including, for example, data values interpolated from various data tables) associated with the clusters. In response to analyst inputs the user interface may be updated to display enriched data associated with each of the generated groups of clusters if the analyst desires to dive deeper into data associated with a given cluster.

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without analyst input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
   one or more computer readable storage devices configured to store a plurality of computer executable instructions; and
   one or more hardware computer processors in communication with the one or more computer readable storage devices and configured to execute the plurality of computer executable instructions to cause the computer system to:
   generate a first interactive user interface configured to allow a user to define a user interface template, wherein the first interactive user interface includes one or more input areas configured to receive user input for indicating data enrichments associated with the user interface template, wherein at least one input area of the one or more input areas is further configured to receive a reference variable link which is associated with a reference table, and wherein the reference variable link allows for automatic joining of up-to-date data from the reference table with one or more data clusters that are received by the computer system;
   receive a data cluster comprising a group of raw data items, wherein each raw data item is associated with a respective one or more attributes, and wherein the group of raw data items are related based at least partly on the respective one or more attributes; and
   generate a second interactive user interface to display information associated with the data cluster, wherein the second interactive user interface is generated based at least in part on the user interface template including one or more data enrichments that are applied to the data cluster via the reference table.

2. The computer system of claim 1, wherein the plurality of computer executable instructions further cause the computer system to:
   perform an analysis on the data cluster based on a scoring strategy; and
   add the analysis to the data cluster.

3. The computer system of claim 1, wherein the second interactive user interface comprises a display area displaying at least a portion of the information associated with the data cluster and any associated attributes in a tabular format.

4. The computer system of claim 1, wherein the second interactive user interface comprises a display area displaying a timeline of at least a portion of the data cluster organized at least in part by a time-based attribute associated with the portion of the data cluster.

5. The computer system of claim 1, wherein the user interface template comprises a plurality of sections, and wherein the second interactive user interface is displayed according to the plurality of sections of the user interface template.

6. The computer system of claim 1, wherein the plurality of computer executable instructions further cause the computer system to:
   pack the user interface template into a data package; and
   unpack the data package to obtain the user interface template prior to generating the second interactive user interface.

7. The computer system of claim 1, wherein the group of raw data items is stored in one or more data tables in a database.

8. The computer system of claim 7, wherein generating the second interactive user interface comprises directly accessing the one or more data tables.

9. The computer system of claim 8, wherein generating the second interactive user interface further comprises querying the raw data items stored in the one or more data tables, based at least in part upon the user interface template.

10. A computer-implemented method comprising:
    generating a first interactive user interface configured to allow a user to define a user interface template, wherein the first interactive user interface includes one or more input areas configured to receive user input for indicating data enrichments associated with the user interface template, wherein at least one input area of the one or more input areas is further configured to receive a reference variable link which is associated with a reference table;
    receiving a data cluster comprising a group of raw data items, wherein each raw data item is associated with a respective one or more attributes, and wherein the group of raw data items are related based at least partly on the respective one or more attributes; and
    generating a second interactive user interface to display information associated with the data cluster, wherein the second interactive user interface is generated based at least in part on the user interface template including one or more data enrichments that are applied to the data cluster via the reference table, and wherein the second interactive user interface comprises a display area displaying a timeline of at least a portion of the data cluster organized at least in part by a time-based attribute associated with the portion of the data cluster.

11. The computer-implemented method of claim 10, wherein the reference variable link allows for the automatic joining of up-to-date data from the reference table to received data clusters.

12. The computer-implemented method of claim 10, further comprising:
performing an analysis on the data cluster based on a scoring strategy; and
adding the analysis to the data cluster.

13. The computer-implemented method of claim 10, wherein the display area also displays at least a portion of the information associated with the data cluster and any associated attributes in a tabular format.

14. The computer-implemented method of claim 10, wherein the user interface template comprises a plurality of sections, and wherein the second interactive user interface is displayed according to the plurality of sections of the user interface template.

15. The computer-implemented method of claim 10, wherein the group of raw data items is stored in one or more data tables in a database.

16. A non-transitory computer-readable medium storing a set of instructions that are executable by one or more processors to cause the one or more processors to:
generate a first interactive user interface configured to allow a user to define a user interface template, wherein the first interactive user interface includes one or more input areas configured to receive user input for indicating data enrichments associated with the user interface template, wherein at least one input area of the one or more input areas is further configured to receive a reference variable link which is associated with a reference table;
pack the user interface template into a data package;
receive a data cluster comprising a group of raw data items, wherein each raw data item is associated with a respective one or more attributes, and wherein the group of raw data items are related based at least partly on the respective one or more attributes;
unpack the data package to obtain the user interface template; and
after unpacking the data package, generate a second interactive user interface to display information associated with the data cluster, wherein the second interactive user interface is generated based at least in part on the user interface template including one or more data enrichments that are applied to the data cluster via the reference table.

17. The non-transitory computer-readable medium of claim 16, wherein the reference variable link allows for the automatic joining of up-to-date data from the reference table to received data clusters.

18. The non-transitory computer-readable medium of claim 16, wherein the set of instructions are further configured to cause the one or more processors to:
perform an analysis on the data cluster based on a scoring strategy; and
add the analysis to the data cluster.

* * * * *